(12) United States Patent
Matsuura

(10) Patent No.: US 8,639,173 B2
(45) Date of Patent: Jan. 28, 2014

(54) LUBRICANT SUPPLY DEVICE HAVING A LUBRICANT PRESSING MECHANISM, AND PROCESS CARTRIDGE AND IMAGE FORMING APPARATUS INCLUDING THE SAME

(75) Inventor: Hiroki Matsuura, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 388 days.

(21) Appl. No.: 12/929,989

(22) Filed: Mar. 1, 2011

(65) Prior Publication Data
US 2011/0229195 A1 Sep. 22, 2011

(30) Foreign Application Priority Data

Mar. 17, 2010 (JP) .................................. 2010-060206
Oct. 15, 2010 (JP) .................................. 2010-232120

(51) Int. Cl.
*G03G 21/00* (2006.01)
*F16N 15/00* (2006.01)

(52) U.S. Cl.
USPC ............................................. 399/346; 184/99

(58) Field of Classification Search
USPC ..................................... 399/346; 184/99, 101
See application file for complete search history.

(56) References Cited

U.S. PATENT DOCUMENTS

2007/0068738 A1* 3/2007 Kawahara et al. .............. 184/99
2009/0297238 A1 12/2009 Matsuura et al.

FOREIGN PATENT DOCUMENTS

| JP | 2000330425 A | * | 11/2000 | ............. G03G 21/00 |
| JP | 2007-293240 A | | 11/2007 | |
| JP | 2009-042274 A | | 2/2009 | |

* cited by examiner

*Primary Examiner* — Billy J Lactaoen
(74) *Attorney, Agent, or Firm* — Harness, Dickey & Pierce, P.L.C.

(57) ABSTRACT

A pressing mechanism that presses a solid lubricant against a brush roller includes two movable members that receive the biasing force of a single biasing unit, rotate around a fulcrum, and press places of the solid lubricant at the symmetric positions with respect to the center of a contact portion of the solid lubricant. The curvature of a portion of a curve shape of the movable member that contacts a casing inner wall is set such that the pressing force in a pressing direction of the solid lubricant in the last stage becomes greater than the pressing force in an intermediate stage, from the initial stage to the last stage after the solid lubricant of the predetermined amount or more is scraped off via the intermediate stage.

20 Claims, 11 Drawing Sheets

LUBRICANT SUPPLY DEVICE HAVING A LUBRICANT PRESSING MECHANISM, AND PROCESS CARTRIDGE AND IMAGE FORMING APPARATUS INCLUDING THE SAME

CROSS-REFERENCE TO RELATED APPLICATIONS

The present application claims priority to and incorporates by reference the entire contents of Japanese Patent Application No. 2010-60206 filed in Japan on Mar. 17, 2010 and Japanese Patent Application No. 2010-232120 filed in Japan on Oct. 15, 2010.

BACKGROUND OF THE INVENTION

1. Field of the Invention

The present invention relates to a lubricant supply device that scrapes a lubricant off a solid lubricant by contacting and rubbing the solid lubricant to supply the lubricant to a lubricant supply target, and a process cartridge and an image forming apparatus such as a copying machine, a printer and a facsimile including the same.

2. Description of the Related Art

As this kind of lubricant supply device, for example, there is known a lubricant supply device described in Japanese Patent Application Laid-open No. 2007-293240. The lubricant supply device described in Japanese Patent Application Laid-open No. 2007-293240 includes a brush roller (supply member) that contacts a solid lubricant having a bar shape and supplies a powdery lubricant scraped by rubbing the solid lubricant, to a photosensitive element belt or an intermediate transfer belt (lubricant supply target). The solid lubricant is pressed against the brush roller by a pressing mechanism. When the brush roller rotates, the solid lubricant that is in contact with the brush roller is rubbed. Thereby, the lubricant, which is scraped off the solid lubricant and is attached to the brush roller, is applied to the surface of the photosensitive element belt or the intermediate transfer belt. In the lubricant supply device, the pressing mechanism presses the solid lubricant against the brush roller in a manner such that the contact pressure between the solid lubricant and the brush roller is constant from the initial stage to the last stage, even though the solid lubricant is gradually scraped off every when the brush roller contacts and rubs the solid lubricant.

FIG. 15 is a partially enlarged view showing a main portion of the pressing mechanism of the lubricant supply device that is described in Japanese Patent Application Laid-open No. 2007-293240. FIG. 15 shows the main portion of the pressing mechanism of the lubricant supply device when viewed from a direction orthogonal to both of a longitudinal direction (horizontal direction in the drawing) of a solid lubricant 162 and a pressing direction (vertical direction in the drawing) of the solid lubricant 162 with respect to a brush roller 161. FIG. 15 is an enlarged view of one end side of the solid lubricant 162 in the longitudinal direction. The configuration of the other end side of the solid lubricant 162 in the longitudinal direction is the same as the configuration of one end side.

A pressing mechanism 463 is provided with a lubricant holding member 162A that holds a portion (on lower side in the drawing) of the solid lubricant 162, in which the portion is opposite to a portion contacting the brush roller 161 in the longitudinal direction. To each of both ends of the lubricant holding member 162A in the longitudinal direction, attached is a movable member 463A that functions as a pressing member, as shown in FIG. 15. One end (attachment end) of the movable member 463A is attached rotatably with respect to the lubricant holding member 162A and the other end (rotating end) rotates in a direction of an arrow C in the drawing using the attachment position 163B as a fulcrum (rotation center). To the movable member 463A, each end of a single spring 163C that is a single biasing unit is attached. Each movable member 463A obtains the biasing force of a direction of an arrow D in the drawing, which is directed to the center of a longitudinal direction of the lubricant holding member 162A from the single spring 163C. By this biasing force, the rotating end of each movable member 463A obtains the rotating force in a direction that gets away from the lubricant holding member 162A, as shown in FIG. 15. Each movable member 463A has a contact portion where a section cut along a surface parallel to both a longitudinal direction of the solid lubricant 162 and a pressing direction of the solid lubricant 162 with respect to the brush roller 161 has a circular arc shape. The contact portion contacts a fixing wall (contacting portion) 164 that is a surface parallel to the longitudinal direction of the solid lubricant 162 and orthogonal to the pressing direction of the solid lubricant 162 with respect to the brush roller 161, by the biasing force of the single spring 163C to rotate each movable member 463A. The contact portion of each movable member 463A contacts the fixing wall 164 and the biasing force of the single spring 163C that rotates each movable member 463A biases the lubricant holding member 162A holding the solid lubricant 162 in a direction apart from the fixing wall 164. As a result, the solid lubricant 162 is pressed against the brush roller 161. The two movable members 463A receive the biasing force of the single spring 163C and press the fixing wall 164 with the equal force. Therefore, the solid lubricant 162 is equally pressed against the brush roller 161, in a longitudinal direction thereof. As a result, the amount of the lubricant that is rubbed and scraped off by rotation of the brush roller 161 becomes uniform in the longitudinal direction, and the lubricant can be coated on a surface of a photosensitive element 5 without unevenness.

The pressing mechanism 463 that is described in Japanese Patent Application Laid-open No. 2007-293240 is advantageous to a general pressing mechanism shown in FIG. 16 in the following points.

In the pressing mechanism 563 shown in FIG. 16, when the height of the solid lubricant 162 decreases over time, the pressing force of the solid lubricant 162 gradually decreases. For this reason, the amount of the solid lubricant 162 that is scraped off by the brush roller 161 temporally decreases, and the change of the amount of powdery lubricant that is supplied to the lubricant supply target from the initial stage to the last stage is large. Meanwhile, in the pressing mechanism 463 that is described in Japanese Patent Application Laid-open No. 2007-293240, even though the height of the solid lubricant 162 decreases over time, the pressing force of the solid lubricant 162 can be suppressed from decreasing. Therefore, the change of the amount of the powdery lubricant that is supplied to the lubricant supply target from the initial stage to the last stage can be minimized.

The reason why the above result is obtained is as follows.

In general, when the entire length of a spring of which the extension change amount changes from the initial stage to a stage where the solid lubricant 162 is completely consumed increases, the change of the biasing force of the spring with respect to the extension change amount of the spring decreases. In the pressing mechanism 563 shown in FIG. 16, a spring 563C needs to be disposed in a compressed state and a direction of the biasing force (pushing force) and the pressing direction of the solid lubricant 162 against the brush roller 161 need to be matched with each other. In this configuration, when the entire length of the spring increases, it becomes difficult to match the direction of the biasing force of the spring 563C and the pressing direction of the solid lubricant 162 against the brush roller 161. Therefore, there is a limitation in increasing the entire length of the spring. In the pressing mechanism 563 shown in FIG. 16, an arrangement space that corresponds to the length of the spring needs to be secured in a radial direction of the brush roller 161, which results in increasing a size of a device. For this reason, in the pressing mechanism shown in FIG. 16, a relatively short spring needs to be used. As a result, the change of the biasing force of the spring 563C with respect to the extension change amount of the spring 563C changing from the initial stage to the stage where the solid lubricant 162 is completely consumed is large. When the height of the solid lubricant 162 decreases over time, the pressing force of the solid lubricant 162 continuously decreases.

Meanwhile, in the pressing mechanism 463 that is described in Japanese Patent Application Laid-open No. 2007-293240, as shown in FIG. 15, the spring 163C can be disposed in an extended state and the solid lubricant 162 can be pressed against the brush roller 161 with the biasing force (tensile force). Therefore, even though the entire length of the spring is increased, the problem of the pressing mechanism that uses the compression spring shown in FIG. 16 is not generated. In the pressing mechanism 463 that is described in Japanese Patent Application Laid-open No. 2007-293240, a longitudinal direction of the spring 163C is matched with a longitudinal direction of the solid lubricant 162. Therefore, the length of the spring 163C can be increased by effectively using a space of the longitudinal direction of the solid lubricant 162. Even though the length of the spring 163C is increased, the arrangement space is not increased in the radial direction of the brush roller and the size of the device is not increased. For this reason, according to the pressing mechanism 463 that is described in Japanese Patent Application Laid-open No. 2007-293240, the spring 163C that is much longer than the compression spring 563C used in the pressing mechanism shown in FIG. 16 can be adopted. As a result, the change of the biasing force of the spring 563C with respect to the extension change amount of the spring 563C changing from the initial stage to the stage where the solid lubricant 162 is completely consumed is small. Even though the height of the solid lubricant 162 decreases over time, the pressing force of the solid lubricant 162 can be suppressed from decreasing.

FIG. 17 shows the force that acts on the movable member 463A of the pressing mechanism 463, on the basis of the technology described in Japanese Patent Application Laid-open No. 2007-293240.

In the pressing mechanism 463, the movable member 463A is configured to freely rotate using the attachment position 163B as the fulcrum. In this case, a point where the movable member 463A makes contact with the fixing wall (contacting portion) 164 is regarded as an action point, the length from the action point to the fulcrum is denoted by the symbol L, and an angle that is formed between a direction connecting the fulcrum and the action point and a pressing direction (vertical direction in the drawing) is expressed by $((\Pi/2)-\theta)$. Further, a point where the movable member 463A receives the biasing force F from the spring 163C is regarded as a force point, the length from the force point to the fulcrum is denoted by the symbol I, and an angle that is formed between a direction connecting the fulcrum and the force point and a direction of the biasing force F is denoted by $\phi$. At this time, according to the technology that is described in Japanese Patent Application Laid-open No. 2007-293240, the magnitude N of the force (force of a pressing direction of the fixing wall (contacting portion) 164 by the movable member 463A) that is generated at the action point is expressed by the following Equation (1).

$$N=(I/L)\times F\times\sin\phi\times\cos\theta \qquad (1)$$

In this case, in the pressing mechanism 463 that is described in Japanese Patent Application Laid-open No. 2007-293240, if the solid lubricant 162 is decreased by being rubbed against the brush roller 161, the position of the force point shifts to the right side in the drawing, and the spring 63C is contracted. For this reason, the biasing force F by the spring 163C decreases. As a result, if the solid lubricant 162 is decreased by being rubbed, the biasing force F shifts in a direction where the magnitude of the force generated at the action point, that is, the pressing force N decreases. However, the decrease amount of the biasing force F with respect to the decrease amount of the solid lubricant 162 (increase amount of h) decreases, as compared with the pressing mechanism 563 shown in FIG. 16. Therefore, the decrease amount of the pressing force N with respect to the decrease amount of the solid lubricant 162 (increase amount of h) can be minimized.

If the solid lubricant 162 is decreased by being rubbed against the brush roller 161, the distance h in the drawing increases correspondingly to the decrease amount. As a result, the angle $((\Pi/2)-\theta)$ that is formed between the direction connecting the action point and the fulcrum and the pressing direction (vertical direction in the drawing) decreases. That is, the angle $\theta$ increases. Therefore, according to the Equation (1) that is described in Japanese Patent Application Laid-open No. 2007-293240, when the solid lubricant 162 decreases, $\cos\theta$ decreases and the magnitude N of the force that is generated at the action point decreases correspondingly to the decrease amount. However, in the pressing mechanism 463 that is described in Japanese Patent Application Laid-open No. 2007-293240, if the solid lubricant 162 decreases, the angle $\phi$ that is formed between the direction connecting the force point and the fulcrum and the direction of the biasing force F increases. Therefore, when the solid lubricant 162 decreases, $\sin\phi$ increases. Since the magnitude N of the force generated at the action point increases correspondingly to the increase amount, according to the technology described in correspondingly to Japanese Patent Application Laid-open No. 2007-293240, at least a part of the decrease amount of N due to the decrease of $\cos\theta$ can be offset by the increase amount of N due to the increase of $\sin\phi$.

In the pressing mechanism 463 that is described in Japanese Patent Application Laid-open No. 2007-293240, as shown in FIG. 15, the contact portion of the movable member 463A that contacts the fixing wall 164 has a circular arc shape. Thereby, a contact place of the movable member 463A with respect to the fixing wall 164 gradually changes according to the decrease of the solid lubricant 162. As a result, if the solid lubricant 162 decreases, the length L from the action point to the fulcrum increases. In this case, if the length L from the action point to the fulcrum increases, the magnitude of the force generated at the action point, that is, the pressing force N decreases. If the length L from the action point to the fulcrum increases, $\theta$ decreases. Therefore, a decrease rate of $\cos\theta$ that decreases according to the decrease of the solid lubricant 162 can be minimized.

As such, according to the pressing mechanism 463 that is described in Japanese Patent Application Laid-open No. 2007-293240, if the solid lubricant 162 is decreased by being rubbed against the brush roller 161 and thereby h increases, based on this, L increases, F decreases, $\sin\phi$ increases, and cos θ decreases. Meanwhile, as described above, as compared with the pressing mechanism 563 shown in FIG. 16, the decrease rate of F can be suppressed. By adopting the configuration where the length L from the action point to the fulcrum gradually increases, the decrease rate of cos θ can be suppressed. As a result, as compared with the pressing mechanism shown in FIG. 17, the decrease rate of the pressing force N can be suppressed. Therefore, even though the solid lubricant 162 is decreased by being rubbed against the brush roller 161, the change amount of the magnitude N of the force that is generated at the action point can be decreased. As a result, the change of the amount of the powdery lubricant that is applied to the lubricant supply target from the initial stage to the last stage can be minimized.

According to the pressing mechanism 463 that is described in Japanese Patent Application Laid-open No. 2007-293240, by increasing the length according to the decrease of the solid lubricant 162 and appropriately adjusting the various parameters to change the pressing force N, the change amount of the pressing force N from the initial stage to the last stage can be decreased, as compared with the pressing mechanism 563 shown in FIG. 16. However, in the pressing mechanism that is described in Japanese Patent Application Laid-open No. 2007-293240, in the last stage where the solid lubricant 162 of the predetermined amount or more is scraped off and the remaining solid lubricant 162 becomes small, the amount of the powdery lubricant that is supplied to the lubricant supply target is insufficient.

According to the pressing mechanism 463 that is described in Japanese Patent Application Laid-open No. 2007-293240, for example, when a solid lubricant formed through the melting process is used, by appropriately adjusting the various parameters, the powdery lubricant of the appropriate amount can be supplied to the lubricant supply target from the initial stage where the solid lubricant starts being scraped off to the intermediate stage. However, in the pressing mechanism that is described in Japanese Patent Application Laid-open No. 2007-293240, for example, when the solid lubricant obtained by compressing the powdery lubricant is used, the amount of the powdery lubricant that is supplied to the lubricant supply target in the initial stage becomes excessive.

As a result of zealous study, the inventor(s) found out that the problem of insufficient amount of the powdery lubricant supplied to the lubricant supply target in the last stage is caused by the following reason. That is, by recent extension of the life span of the solid lubricant 162, in the last stage, the capability of the supply member to scrape off the solid lubricant is lowered than the required capability over time. As a result, with the same pressing force as that in the initial stage or the intermediate stage, the sufficient amount of the powdery lubricant cannot be scraped off the solid lubricant in the last stage. For this reason, the amount of the powdery lubricant that is supplied to the lubricant supply target in the last stage is insufficient.

Therefore, in the invention according to a first aspect, the pressing force of the solid lubricant in the last stage becomes greater than the pressing force in the intermediate stage. As such, by increasing the pressing force of the solid lubricant in the last stage, the scraping capability of the supply member that is lowered in the last stage can be reinforced, and the scraped lubricant amount that is similar to or equal to the scraped lubricant amount in the intermediate stage can be realized in the last stage.

As a result of zealous study, the inventor(s) found out that the problem of excessive supply amount of lubricant in the initial stage in the case of using the solid lubricant obtained by compressing the powdery lubricant is caused by the following reason. That is, when the solid lubricant obtained by compressing the powdery lubricant starts to be scraped off by the supply member, the powdery lubricant may be formed into minute agglomerates due to rubbing and be peeled off from the solid lubricant. Thereby, the lubricant may be scraped off more than the desired scraping amount. As a result, the excessive supply amount of the lubricant in the initial stage is generated. Further, the peeling-off phenomenon of the powdery lubricant being formed into minute agglomerates and peeled off from the solid lubricant is rarely occurred in the intermediate stage. Therefore, the desired scraping amount can be stably obtained in the intermediate stage.

Therefore, in the invention according to a second aspect, the pressing force of the solid lubricant in the initial stage becomes smaller than the pressing force in the intermediate stage. As such, by decreasing the pressing force of the solid lubricant in the initial stage, the peeling-off phenomenon that is occurred in the initial stage can be suppressed and the scraped lubricant amount that is similar to or equal to the scraped lubricant amount in the intermediate stage can be realized in the initial stage.

SUMMARY OF THE INVENTION

It is an object of the present invention to at least partially solve the problems in the conventional technology.

According to an aspect of the present invention, a lubricant supply device includes: a solid lubricant; a supply member that makes contact with the solid lubricant and supplies a lubricant being scraped off by rubbing the solid lubricant, to a lubricant supply target; and a pressing mechanism that presses the solid lubricant against the supply member. The pressing mechanism includes a single biasing unit, and a plurality of pressing members that receive the biasing force of the single biasing unit and press the solid lubricant at symmetric positions with respect to the center of a contact portion of the solid lubricant. Each of the plurality of pressing members changes a contacting point against a contact place to a contacting portion by rotating around a fulcrum with the biasing force. The pressing mechanism is configured such that an angle formed between a direction connecting an action point where each pressing member contacts the contacting portion and the fulcrum and a pressing direction of the solid lubricant decreases, and an angle formed between a direction connecting a force point of each pressing member receiving the biasing force of the single biasing unit and the fulcrum and a direction of the biasing force increases, according to the decrease of the solid lubricant by the rubbing. From an initial stage where the solid lubricant starts to be scraped off by rubbing to a last stage after a predetermined amount or more of the solid lubricant is scraped off via an intermediate stage, the pressing force in the pressing direction of the solid lubricant that is generated at the action point in the last stage becomes greater than the pressing force in the intermediate stage.

According to another aspect of the present invention, a lubricant supply device includes: a solid lubricant; a supply member that makes contact with the solid lubricant and supplies a lubricant being scraped off by rubbing the solid lubricant, to a lubricant supply target; and a pressing mechanism that presses the solid lubricant against the supply member. The pressing mechanism includes a single biasing unit, and a plurality of pressing members that receive the biasing force of the single biasing unit and press the solid lubricant at symmetric positions with respect to the center of a contact portion of the solid lubricant. Each of the plurality of pressing members changes a contacting point against a contact place to a contacting portion by rotating around a fulcrum with the biasing force. The pressing mechanism is configured such that an angle formed between a direction connecting an action point where each pressing member contacts the contacting portion and the fulcrum and a pressing direction of the solid lubricant decreases, and an angle formed between a direction connecting a force point of each pressing member receiving the biasing force of the single biasing unit and the fulcrum and a direction of the biasing force increases, according to the decrease of the solid lubricant by the rubbing. From an initial stage where the solid lubricant starts to be scraped off by rubbing to a last stage after a predetermined amount or more of the solid lubricant is scraped off via an intermediate stage, the pressing force in the pressing direction of the solid lubricant that is generated at the action point in the initial stage becomes smaller than the pressing force in the intermediate stage.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First Embodiment

Hereinafter, an embodiment (hereinafter, this embodiment is referred to as a "first embodiment") where the present invention is applied to a printer functioning as an image forming apparatus will be. described.

Figure 1:
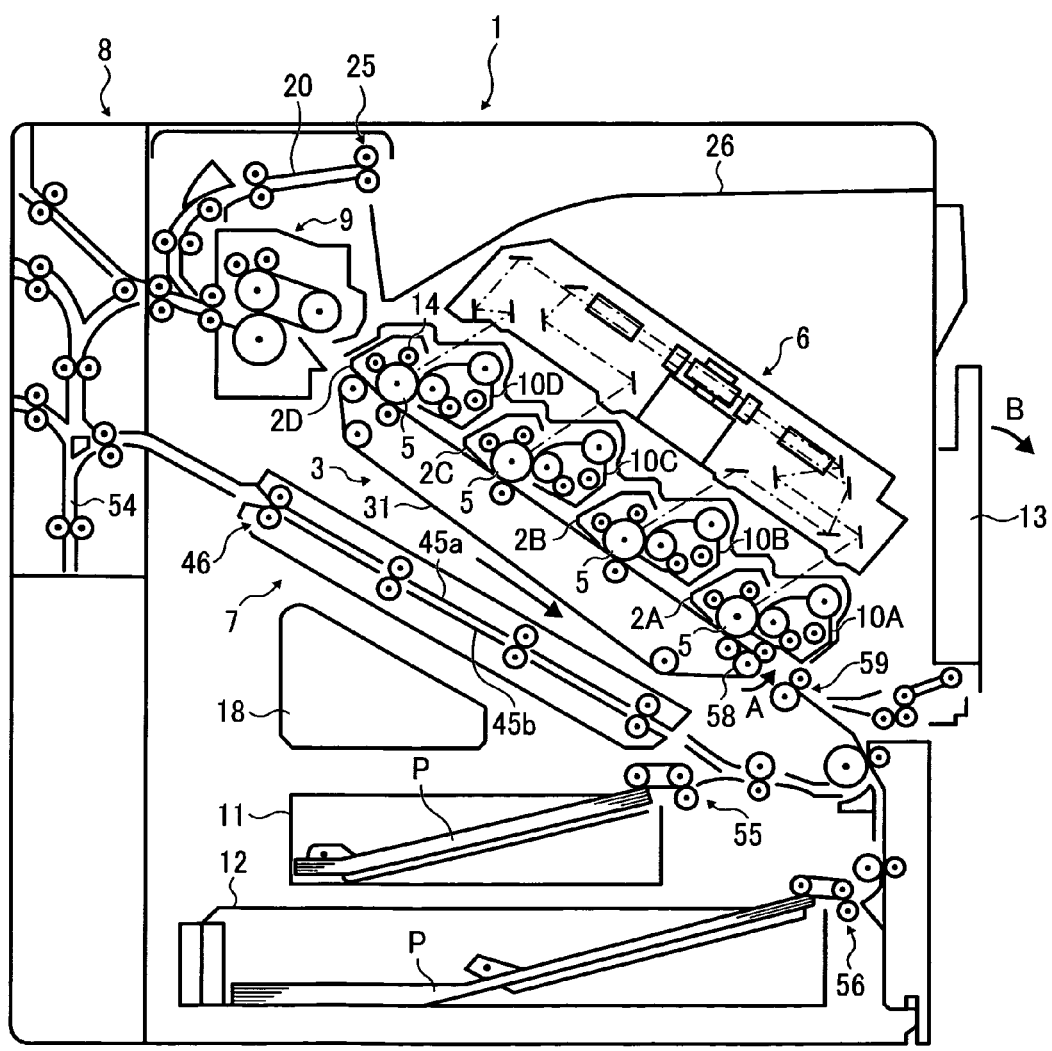
FIG. 1 is a schematic view showing the entire configuration of a printer according to an embodiment.

FIG. 1 schematically shows the entire configuration of the printer according to the first embodiment.

In a main body of a printer 1, image forming units 2A, 2B, 2C, and 2D that include photosensitive elements corresponding to four image carriers are mounted to be attached and detached. In an approximately central portion of the main body of the printer, a transfer device 3 that includes a transfer belt 31 spanned around plural rollers is provided. The transfer belt 31 is driven to rotate in a direction of an arrow "A" in the drawing. The image forming units 2A, 2B, 2C and 2D are located above the transfer belt 31 and are disposed such that the individual photosensitive elements 5 contact a surface of the transfer belt 31. Further, developing devices 10A, 10B, 10C and 10D where used toner colors are different from each other are provided to correspond to the image forming units 2A, 2B, 2C and 2D. The image forming units 2A, 2B, 2C and 2D have substantially the same structure. The image forming unit 2A forms an image corresponding to magenta, the image forming unit 2B forms an image corresponding to cyan, the image forming unit 2C forms an image corresponding to yellow, and the image forming unit 2D forms an image corresponding to black.

A writing unit 6 is disposed above the image forming units 2A, 2B, 2C and 2D. The writing unit 6 has four light sources using laser diodes (LDs) prepared for the individual colors, a polygon scanner of one set that includes a polygon mirror having six surfaces and a polygon motor, and an optical system that includes an fθ lens or a long cylindrical lens disposed on an optical path of each light source. The laser light that is emitted from each laser diode is deflected and scanned by the polygon scanner and illuminates the surface of each photosensitive element 5.

A duplex unit 7 is disposed below the transfer belt 31. Further, a reversing unit 8 that reverses image formed transfer paper (recording material) and discharges the transfer paper or carries the transfer paper to the duplex unit 7 is installed at the left side of the main body of the printer. The duplex unit 7 includes a pair of carriage guiding plates 45a and 45b and plural pairs (four pairs, in this example) of carriage rollers 46. In a duplex image forming mode in which images are formed on both sides of the transfer paper, after forming an image on one side of the transfer paper, the transfer paper is carried to a reversing conveying path 54 of the reversing unit 8, and the reversing unit 8 reverses the transfer paper and carries the transfer paper to a paper feeding unit. The reversing unit 8 reverses a transfer paper for forming images on both sides thereof and carries the transfer paper to the duplex unit 7 as described above, or discharges the image formed transfer paper to the outside of the printer without reversing the transfer paper or reverses the transfer paper and discharges the transfer paper to the outside of the printer. In the paper feeding unit where paper cassettes 11 and 12 are provided, paper separating/feeding units 55 and 56 that separate transfer paper one by one and feed the separated transfer paper are provided.

A fixing device 9 that fixes an image transferred to transfer paper to the transfer paper is provided between the transfer belt 31 and the reversing unit 8. A reverse discharging path 20 is bifurcated and formed at the downstream side of the fixing device 9 in a carriage direction of the transfer paper, and the transfer paper carried to the reverse discharging path 20 is discharged to a discharge tray 26 with a discharging roller pair 25. The paper cassettes 11 and 12 are provided in a lower portion of the main body of the printer and store the transfer paper having different sizes in two upper and lower steps. Further, a manual tray 13 is provided on the right side of the main body of the printer, in a state where the manual tray 13 can be opened and closed in a direction of an arrow "B" in the drawing. By opening the manual tray 13, the transfer paper can be manually fed from the manual tray.

Figure 2:
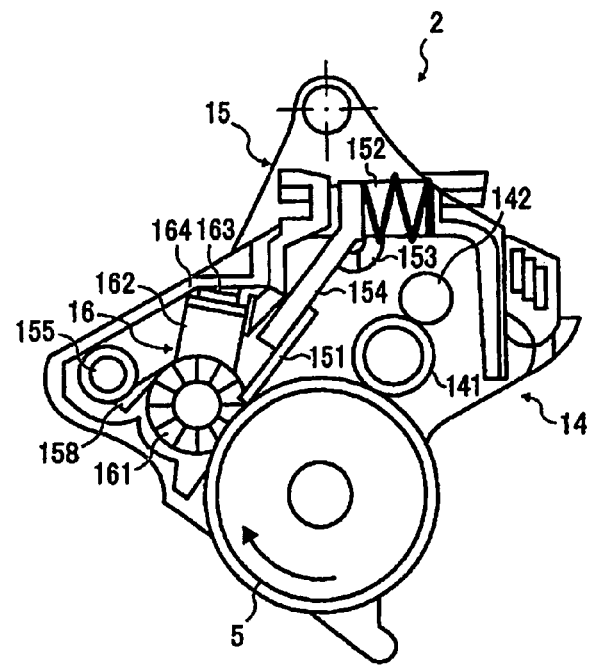
FIG. 2 is a schematic view showing the configuration of one of four image forming units that are included in the printer.

FIG. 2 schematically shows the configuration of one of the four image forming units 2A, 2B, 2C, and 2D.

Each of the image forming units 2A, 2B, 2C and 2D includes a photosensitive element 5 on which a latent image is formed, a charging device 14 that uniformly charges a surface of the photosensitive element 5, and a cleaning device 15 that cleans the surface of the photosensitive element 5. Each of the image forming units 2A, 2B, 2C, and 2D becomes a process cartridge that is configured to be attached to the main body of the printer.

As a formation material of the photosensitive element 5, a material having optical conductivity, for example, an amorphous metal such as amorphous silicon and amorphous selenium or an organic compound such as a bisazo pigment, a phthalocyanine pigment may be used. When an environmental problem and post-processing after the photosensitive element 5 is used is considered, an OPC photosensitive element using the organic compound is preferable.

For the charging device 14, any one of a corona method, a roller method, a brush method, and a blade method may be used. In this embodiment, the roller method is used in the charging device 14. The charging device 14 includes a charging roller 141, a charging roller cleaning brush 142 that contacts the charging roller 141 to clean the charging roller 141, and a power supply (not shown in the drawings) that is connected to the charging roller 141. The charging device 14 uniformly charges the surface of the photosensitive element 5 by applying a high voltage to the charging roller 141.

The cleaning device 15 includes a cleaning blade 151 that contacts the photosensitive element 5, and houses a lubricant coating device 16 functioning as a lubricant supply device that scrapes the solid lubricant 162 and supplies the powdery lubricant to the surface of the photosensitive surface 5 (lubricant supply target), at the upstream side of the cleaning blade 151 in the direction in which the surface of the photosensitive element 5 moves. The detail of the lubricant coating device 16 will be described below. A toner that remains on the surface of the photosensitive element 5 after completing the primary transfer is first collected from the surface of the photosensitive element 5 by the lubricant coating device 16, and the lubricant is coated on the surface of the photosensitive element 5. Then, the toner that remains on the surface of the photosensitive element 5 is scraped by the cleaning blade 151. In the first embodiment, the lubricant coating device 16 is housed in the cleaning device 15. However, the lubricant coating device 16 may be configured to be separated from the cleaning device 15.

Each of the developing devices 10A, 10B, 10C and 10D includes a developing roller that faces the photosensitive element 5, a screw that carries a developer while stirring the developer, and a toner density sensor. In the first embodiment, a two-component developer that includes a toner and magnetic carriers is used as the developer. Therefore, the developing roller includes a sleeve that is driven to rotate and a magnet that is fixedly disposed on the inner side of the sleeve. The toner is replenished to each of the developing devices 10A, 10B, 10C and 10D from a toner replenishment device (not shown in the drawings), according to an output of the toner density sensor. For the magnetic carriers, generally, a core material itself or a core material having a coating layer is used. In the first embodiment, a resin coated carrier using ferrite or magnetite is used as the core material. The particle diameter of the core material is about 20 to 65 µm, preferably about 30 to 60 µm. As the resin that is used for the carrier coating layer, a styrene resin, an acrylic resin, a fluorine resin, a silicone resin, or a mixture or copolymer of those resins may be used. The covering layer may be formed by coating the resin on the surface of the carrier core material particle using a spraying method or a dipping method, similar to the related art.

Next, the operation of the printer 1 will be described.

If an image forming operation starts, the photosensitive elements 5 rotate in a clockwise direction in the drawing. After the surfaces of the photosensitive elements 5 are uniformly charged with the charging rollers 141, laser light corresponding to a magenta image illuminates the photosensitive element 5 of the image forming unit 2A by the writing unit 6, laser light corresponding to a cyan image illuminates the photosensitive element 5 of the image forming unit 2B by the writing unit 6, laser light corresponding to a yellow image illuminates the photosensitive element 5 of the image forming unit 2C by the writing unit 6, and laser light corresponding to a black image illuminates the photosensitive element 5 of the image forming unit 2D by the writing unit 6. Thereby, latent images that correspond to image data of the individual colors are formed on the surfaces of the photosensitive elements 5. The latent images arrive at the positions facing the developing devices 10A, 10B, 10C, and 10D by rotation of the photosensitive elements 5, and the latent images are developed by the toners of magenta, cyan, yellow, and black and become a toner image of four colors.

Meanwhile, the transfer paper is fed from the paper cassettes 11 and 12 by the paper separating/feeding unit, and the transfer paper is carried at the timing to be matched with the toner images formed on the photosensitive elements 5 by a registration roller pair 59 provided immediately before the transfer belt 31. The transfer paper is charged with the positive polarity by a paper adsorbing roller 5B provided in the vicinity of the entrance of the transfer belt 31. Thereby, the transfer paper is electrostatically adsorbed into the surface of the transfer belt 31. While the transfer paper is being carried in a state of being adsorbed into the transfer belt 31, the toner images of magenta, cyan, yellow, and black are sequentially transferred onto the transfer paper and a full-color toner image where four color images are overlapped is formed. The transfer paper is carried to the fixing device 9 where the heat and the pressure are applied to the transfer paper, and the toner image is melted and fixed. Then, according to a designated mode, the transfer paper is reversed and discharged to the discharge tray 26 on the main body of the printer through a discharge system or is carried straightly from the fixing device 9 to be directly discharged after passing through the reversing unit 8. When a duplex image forming mode is selected, the transfer paper is fed to the reverse conveying path in the reversing unit 8, is reversed, is carried to the duplex unit 7, and is fed again from the duplex unit 7. Then, an image is formed on a back surface of the transfer paper in an image forming portion where the image forming units 2A, 2B, 2C and 2D are provided, and the transfer paper is discharged.

Next, the configuration of the lubricant coating device 16 that is a characteristic portion of the present invention will be described.

As shown in FIG. 2, the lubricant coating device 16 according to the first embodiment includes a brush roller 161 that functions as a supply member, a solid lubricant 162 that has a rod shape long in a direction of a plane of paper in the drawing, and a pressing mechanism 163 that is a pressing device. A rotation direction of the brush roller 161 is a direction in which the brush roller 161 rotates by rotation of the photosensitive element 5. The brush roller 161 is formed of a material that is obtained by adding a resistance control material such as carbon black to a resin material such as nylon and acryl and adjusting volume resistivity in a range from $1 \times 10^3$ $\Omega$cm to $1 \times 10^8$ $\Omega$cm. The solid lubricant 162 is pressed against the brush roller 161 by the pressing mechanism 163. As the formation material of the solid lubricant 162, fatty acid metallic salts, such as lead oleate, zinc oleate, copper oleate, zinc stearate, cobalt stearate, iron stearate, copper stearate, zinc palmitate, copper palmitate, and zinc linoleate may be used. Among the fatty acid metallic salts described above, the zinc stearate is most preferable. Further, the solid lubricant 162 according to the first embodiment is obtained by compressing and forming a raw material of a lubricant containing zinc stearate and boron nitride. The method of forming the solid lubricant 162 is not limited to the above method and another forming method using melting and forming may be adopted.

The brush roller 161 is driven to rotate and the lubricant is scraped off the solid lubricant 162, and the lubricant of minute particles is coated on the surface of the photosensitive element 5. Then, by contacting the urface of the photosensitive element 5 and the cleaning blade 151, the coated lubricant is pressed and spread and a shape of the coated lubricant becomes a thin film shape. Thereby, a frictional coefficient of the surface of the photosensitive element 5 decreases. Since the film of the lubricant adhered to the surface of the photosensitive element 5 is very thin, the film of the lubricant does not hinder charging by the charging device 14.

Figure 3:
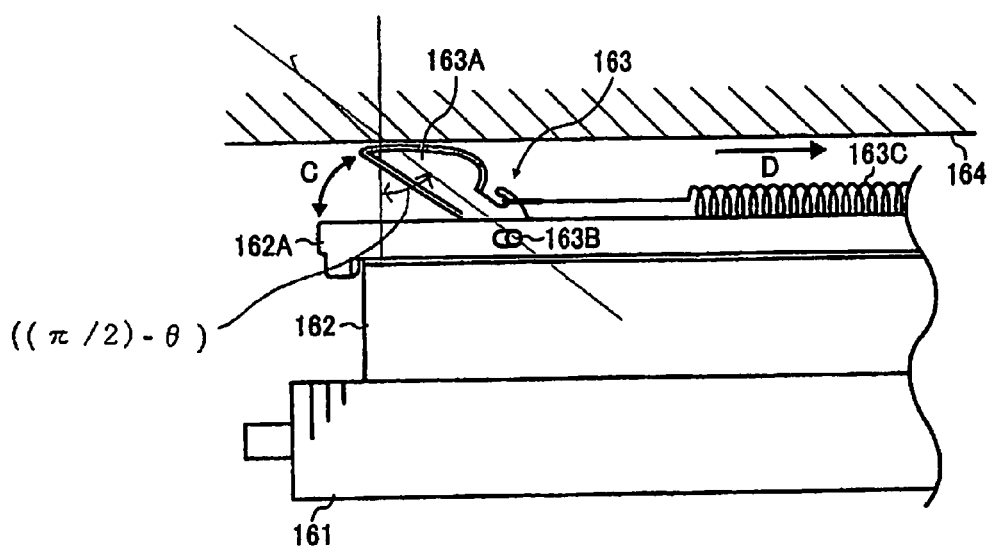
FIG. 3 is a partially enlarged view showing a main portion of a pressing mechanism of a lubricant coating device that is included in the printer.

FIG. 3 is a partially enlarged view showing a main portion of the pressing mechanism 163 according to the first embodiment.

FIG. 3 shows the pressing mechanism 163 that is viewed from a direction orthogonal to both a longitudinal direction (horizontal direction in the drawing) of the solid lubricant 162 and a direction (vertical direction in the drawing) in which the solid lubricant 162 is pressed against the brush roller 161. FIG. 3 is an enlarged view of one end side of the longitudinal direction of the solid lubricant 162. In the first embodiment, the configuration of the other end side of the longitudinal direction of the solid lubricant 162 is the same as the configuration of one end side.

In the first embodiment, the lubricant holding member 162A that holds a portion of the side opposite to the side of a surface (surface of the lower side in the drawing) contacting the brush roller 161 of the solid lubricant 162 in the longitudinal direction is provided. To both ends of the lubricant holding member 162A in the longitudinal direction, the movable member 163A that functions as the pressing member is attached, as shown in FIG. 3. One end (attachment end) of the movable member 163A is attached rotatably with respect to the lubricant holding member 162A and the other end thereof (rotating end) rotates in a direction of an arrow C in the drawing, using an attachment position 163B as the rotation center. To the movable member 163A, each end of a single spring 163C that is a single biasing unit is attached. Each movable member 163A obtains the biasing force of a direction of an arrow D in the drawing toward the center of a longitudinal direction of the lubricant holding member 162A from the single spring 163C. By this biasing force, the rotating end of each movable member 163A is biased in a direction away from the lubricant holding member 162A, as shown in FIG. 3.

The lubricant holding member 162A that holds the solid lubricant 162 is attached to the cleaning device 15, in a state that the movable member 163A and the single spring 163C are attached. When the lubricant holding member 162A is attached to the cleaning device 15, as shown in FIG. 2, the lubricant holding member 162A is disposed between a casing inner wall 164 of the cleaning device 15 functioning as a fixing member and the brush roller 161, in a state where the rotating end of each movable member 163A rotates in a direction approaching the lubricant holding member 162A while resisting against the biasing force of the single spring 163C. By this configuration, the two movable members 163A receive the biasing force of the single spring 163C and press the casing inner wall 164 with the equal force, such that the solid lubricant 162 held by the lubricant holding member 162A is pressed against the brush roller 161. Accordingly, the solid lubricant 162 is pressed against the brush roller 161 with uniform in the longitudinal direction of the solid lubricant 162. As a result, the amount of the lubricant that is scraped off the solid lubricant by rubbing when the brush roller 161 rotates becomes uniform, and the lubricant can be coated on the surface of the photosensitive element 5 without unevenness.

Figure 16:
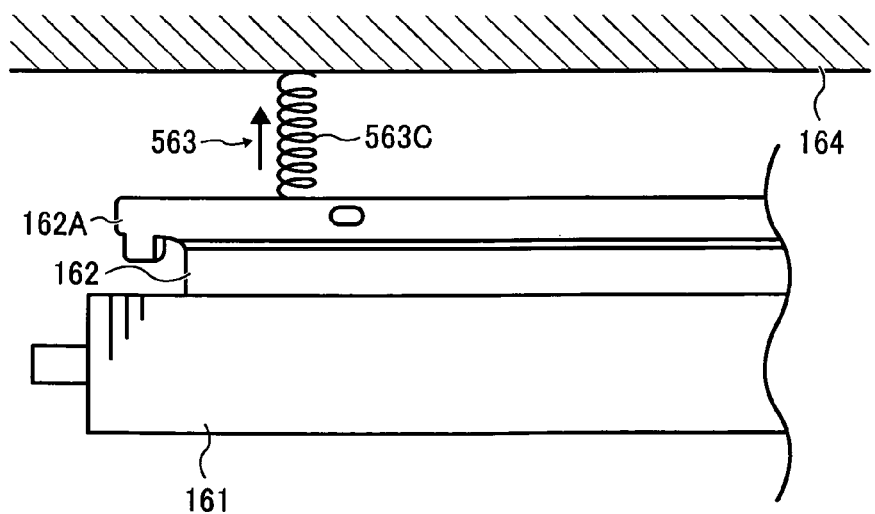
FIG. 16 is a partially enlarged view showing a main portion of a pressing mechanism that is generally adopted in a lubricant supply device.
Figure 17:
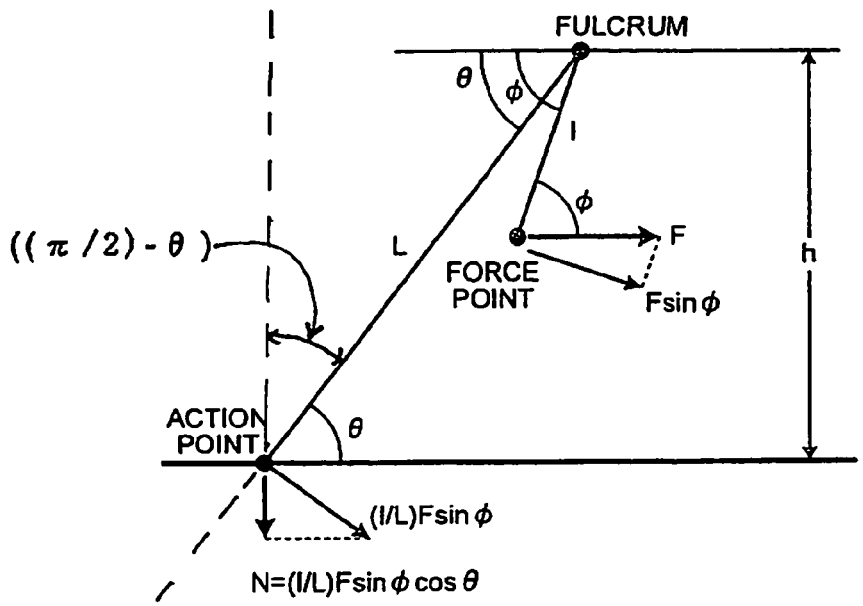
FIG. 17 is a diagram showing the force that acts on a movable member of the pressing mechanism, on the basis of the technology described in Japanese Patent Application Laid-open No. 2007-293240.

The pressing mechanism 163 according to the first embodiment is advantageous to the general pressing mechanism shown in FIG. 16 in the following point.

In the general pressing mechanism, when the height of the solid lubricant 162 decreases over time, the pressing force of the solid lubricant 162 gradually decreases. For this reason, the amount of the solid lubricant 162 that is scraped by the brush roller 161 temporally decreases, and the change of the amount of powdery lubricant that is supplied to the surface of the photosensitive element 5 from an initial stage to a last stage is large. Meanwhile, in the pressing mechanism 163 according to the first embodiment, even though the height of the solid lubricant 162 decreases over time, the pressing force of the solid lubricant 162 can be suppressed from decreasing. Therefore, the change of the amount of the powdery lubricant that is supplied to the surface of the photosensitive element 5 from the initial stage to the last stage can be minimized.

The reason why the above result is obtained is as follows.

In general, when the entire length of a spring of which the extension change amount changes from an initial stage to a stage where the solid lubricant 162 is completely consumed increases, the change of the biasing force of the spring with respect to the extension change amount of the spring decreases. In the general pressing mechanism, as shown in FIG. 16, a spring 563C is disposed in a compressed state and a direction of the biasing force (pushing force) of the spring and the pressing direction of the solid lubricant 162 with respect to the brush roller (supply member) need to be matched with each other. In this configuration, when the entire length of the spring increases, it becomes difficult to match the biasing direction of the spring 563C and the pressing direction of the solid lubricant 162 with respect to the brush roller (supply member). Therefore, there is a limitation in increasing the entire length of the spring. In the general pressing mechanism, an arrangement space that corresponds to the length of the spring needs to be secured in a radial direction of the brush roller, which results in increasing a size of a device. For this reason, in the general pressing mechanism, a relatively short spring needs to be used, and the temporal change of the biasing force of the spring increases.

Meanwhile, in the pressing mechanism 163 according to the first embodiment, as shown in FIG. 3, the single spring 163C is disposed in an extended state, and the solid lubricant 162 is pressed against the brush roller 161 with the biasing force (tensile force) of the spring 163C. Therefore, even though the entire length of the spring increases, the problem of the general pressing mechanism is not generated. Further, in the pressing mechanism 163 according to the first embodiment, the single spring 163C is disposed such that a longitudinal direction of the spring is matched with a longitudinal direction of the solid lubricant 162, that is, an axial direction of the brush roller 161. Therefore, even though the length of the single spring 163C is increased, the arrangement space does not increase in the radial direction of the brush roller and the size of the device does not need be increased. For this reason, in the pressing mechanism 163 according to the first embodiment, the spring 163C that is much longer than the spring used in the general pressing mechanism is adopted. As a result, the temporal change of the biasing force of the spring can be minimized.

Further, the effect that the change of the amount of powdery lubricant supplied to the surface of the photosensitive element 5 from the initial stage to the last stage can be minimized is obtained, because the following structure is adopted in the first embodiment.

That is, in the first embodiment, according to the decrease of the solid lubricant 162 by rubbing the solid lubricant by the brush roller 161, the distance in the pressing direction between a force point of each movable member 463A receiving the biasing force of the single spring 163C and an action point where each movable member 463A contacts the casing inner wall (contacting portion) 164 changes, which will be described in detail below.

Figure 18:
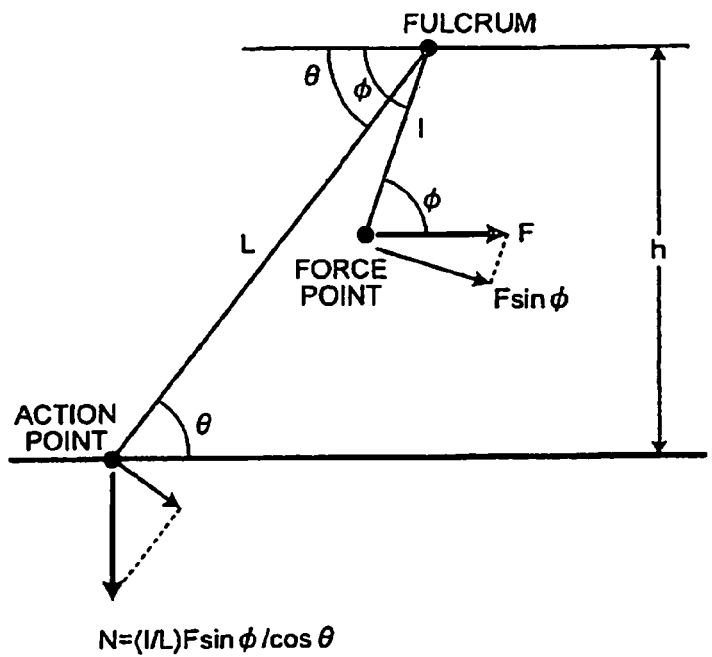
FIG. 18 is a diagram showing the force that acts on the movable members of the pressing mechanisms according to the first and second embodiments.

FIG. 18 shows the force that acts on the movable member 163A of the pressing mechanism 163.

In the first embodiment, the movable member 163A is configured to freely rotate using the attachment position 163B as a fulcrum. In this case, a point where each movable member 163A makes contact with the casing inner wall (contacting portion) 164 is regarded as an action point, the length from the action point to the fulcrum is denoted by the symbol L, and an angle that is formed between a direction connecting the action point and the fulcrum and a pressing direction (vertical direction in FIG. 3) is expressed by $((\Pi/2)-\theta)$. Further, a point where the movable member 163A receives the biasing force F from the single spring 163C is regarded as a force point, the length from the force point to the fulcrum is denoted by the symbol I, and an angle that is formed between a direction connecting the force point and the fulcrum and a direction of the biasing force F is expressed by $\phi$. At this time, the magnitude N of the force that is generated at the action point is represented by the following Equation (2), different from the Equation (1).

$$N=(I/L) \times F \times \sin \theta / \cos \theta \quad (2)$$

In the first embodiment, if the solid lubricant 162 is decreased by rubbing the solid lubricant by the brush roller 161, the position of the force point is changed to the position of the right side in the drawing, and the single spring 163C is contracted. For this reason, the biasing force F by the single spring 163C decreases. As a result, if the solid lubricant 162 is decreased by rubbing, the biasing force F changes in a direction where the magnitude of the force generated at the action point, that is, the pressing force N decreases. However, the decrease amount of the biasing force F with respect to the decrease amount of the solid lubricant 162 (increase amount of h) decreases, as compared with the general pressing mechanism shown in FIG. 16. Therefore, according to the first embodiment, the decrease amount of the pressing force N with respect to the decrease amount of the solid lubricant 162 (increase amount of h) can be minimized.

If the solid lubricant 162 is decreased by rubbing the solid lubricant by the brush roller 161, reference numeral h in the drawing increases by the decrease amount. As a result, the angle $((\Pi/2)-\theta)$ that is formed between the direction connecting the action point and the fulcrum and the pressing direction (vertical direction in the drawing) decreases. That is, the angle $\theta$ increases. Therefore, when the solid lubricant 162 decreases, $\cos \theta$ decreases and the magnitude N of the force that is generated at the action point increases by the decrease amount. In the first embodiment, if the solid lubricant 162 decreases, the angle $\phi$ that is formed between the direction connecting the force point and the fulcrum and the direction of the biasing force F increases. Therefore, when the solid lubricant 162 is decreased by rubbing, $\sin \phi$ increases. Therefore, the magnitude N of the force that is generated at the action point is increased by the increase amount.

Meanwhile, in the first embodiment, as shown in FIG. 3, the contact portion of the movable member 163A that contacts the casing inner wall 164 becomes have a curve shape. Thereby, if the solid lubricant 162 is decreased by rubbing, a contact place of the movable member 163A gradually changes. Therefore, in the first embodiment, if the solid lubricant 162 decreases, the length L from the action point to the fulcrum increases. In this case, if the length L from the action point to the fulcrum increases, the magnitude of the force generated at the action point, that is, the pressing force N decreases. If the length L from the action point to the fulcrum increases, $\theta$ can be decreased. Therefore, a decrease rate of $\cos \theta$ that decreases according to the decrease of the solid lubricant 162 can be minimized.

In order to efficiently transmit the biasing force F to the action point, it is preferable that an angle range of $\phi$ be set to a range approximated to 90° and an angle range of $\theta$ be set to a range approximated to 0°. However, when the angle range of $\theta$ is approximated to 0°, the length of L needs to be increased. For this reason, the angle range of $\theta$ is rarely approximated to 0°, from a relationship of the device layout.

As such, if the solid lubricant 162 is decreased by rubbing the solid lubricant and h increases, L increases, F decreases, $\sin \phi$ increases, and $\cos \theta$ decreases. When L increases and F decreases, the pressing force N decreases. When $\sin \phi$ increases and $\cos \theta$ decreases, the pressing force N increases. According to the first embodiment, the actions are offset from the initial stage to the last stage, and the change in the pressing force N from the initial stage to the last stage can be decreased. According to the first embodiment, the variation of the pressing force of the solid lubricant with respect to the brush roller 161 from the initial stage to the last stage can be minimized.

Meanwhile, even though the variation of the pressing force of the solid lubricant with respect to the brush roller 161 from the initial stage to the last stage is decreased, the scraped lubricant amount becomes excessive in the initial stage where the solid lubricant 162 of the new product starts to be scraped by rubbing the solid lubricant by the brush roller 161. For this reason, the powdery lubricant of the excessive amount may be supplied to the surface of the photosensitive element 5 in the initial stage and the life span of the solid lubricant 162 may be decreased.

Therefore, in the first embodiment, instead of decreasing (substantially equalizing) the variation of the pressing force of the solid lubricant with respect to the brush roller 161 from the initial stage to the last stage, the pressing force of the solid lubricant with respect to the brush roller 161 is decreased in the initial stage.

Figure 4:
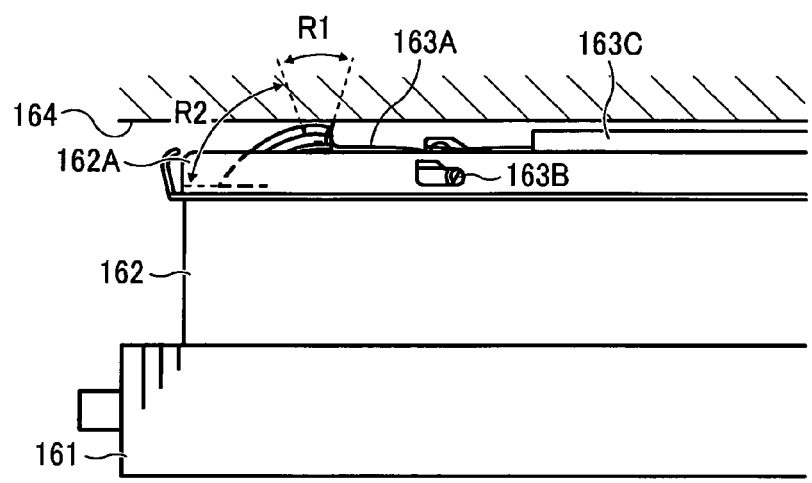
FIG. 4 is a diagram showing a contact state of a movable member and a casing inner wall in an initial stage.

FIG. 4 shows a contact state of the movable member 163A and the casing inner wall 164 in the initial stage.

Figure 5:
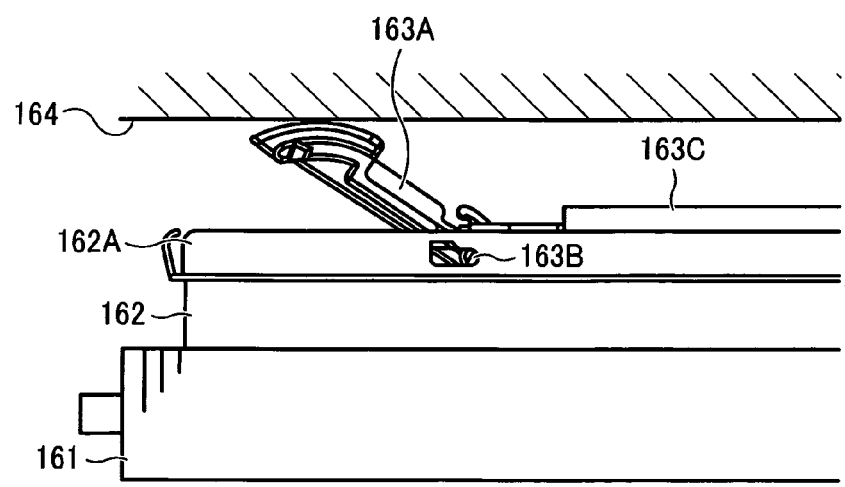
FIG. 5 is a diagram showing a contact state of the movable member and the casing inner wall in an intermediate stage.

FIG. 5 shows a contact state of the movable member 163A and the casing inner wall 164 in the intermediate stage.

Figure 6:
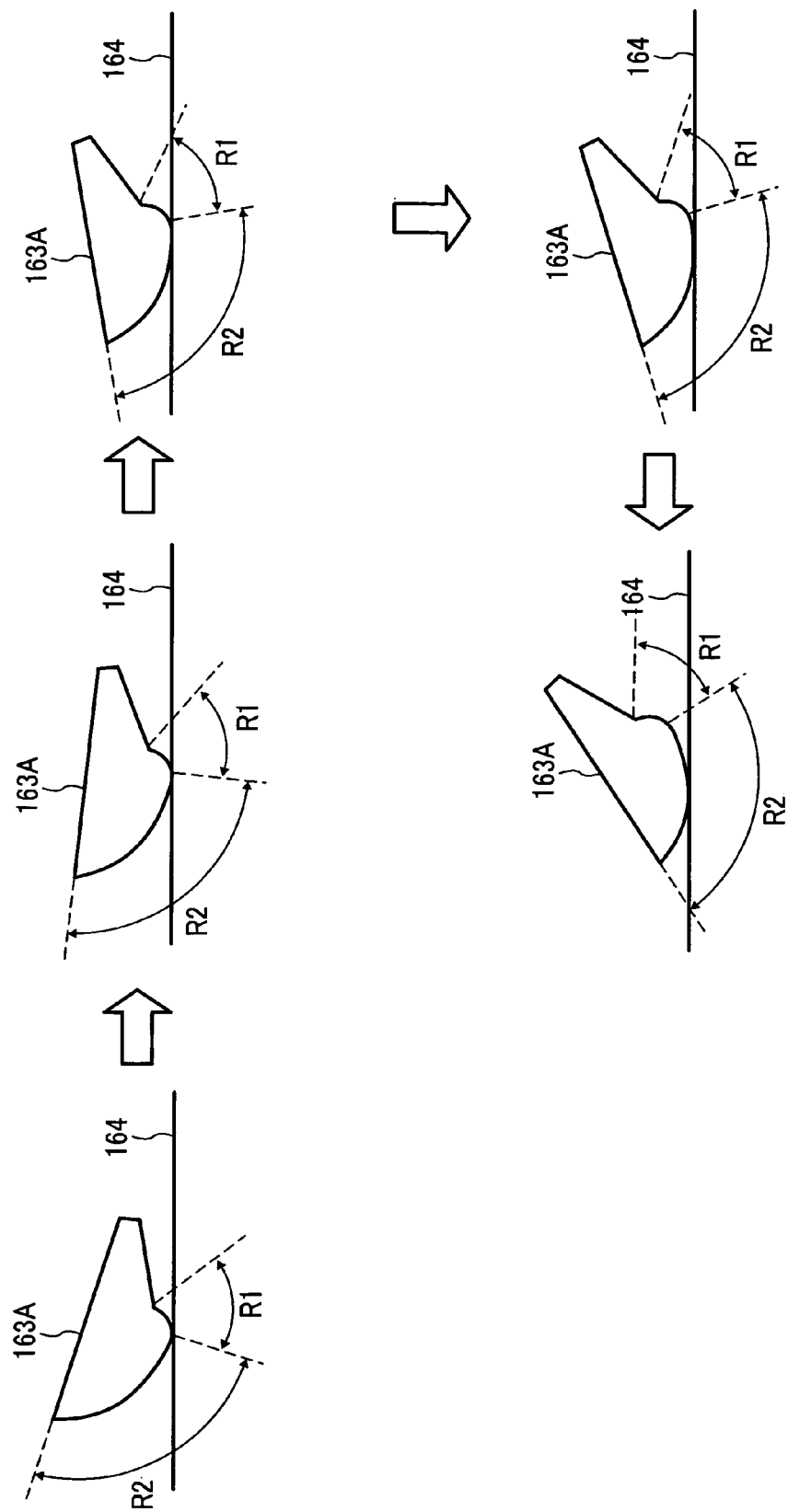
FIG. 6 is a diagram showing the posture change of the movable member from the initial stage to the last stage.

FIG. 6 shows the posture change of the movable member 163A from the initial stage to the last stage.

In the first embodiment, the curvature R1 of a contact place of the movable member 163A that contacts the casing inner wall 164 in the initial stage in the contact portion of the movable member 163A contacting the casing inner wall 164 and the curvature R2 of a contact place of the movable member 163A that contacts the casing inner wall 164 in an intermediate stage are different from each other, from the initial stage where the scraped lubricant amount becomes excessive to the last stage after the solid lubricant 162 of the predetermined amount or more is scraped and the solid lubricant 162 of the small amount remains via the intermediate stage where the scraped lubricant amount is stabilized. Specifically, a curve shape of the contact portion of the movable member 163A is determined such that the curvature R1 corresponding to the initial stage becomes larger than the curvature R2 corresponding to the intermediate stage. Thereby, the pressing force of the solid lubricant in the initial stage becomes smaller than the pressing force in the intermediate stage.

Figure 7:
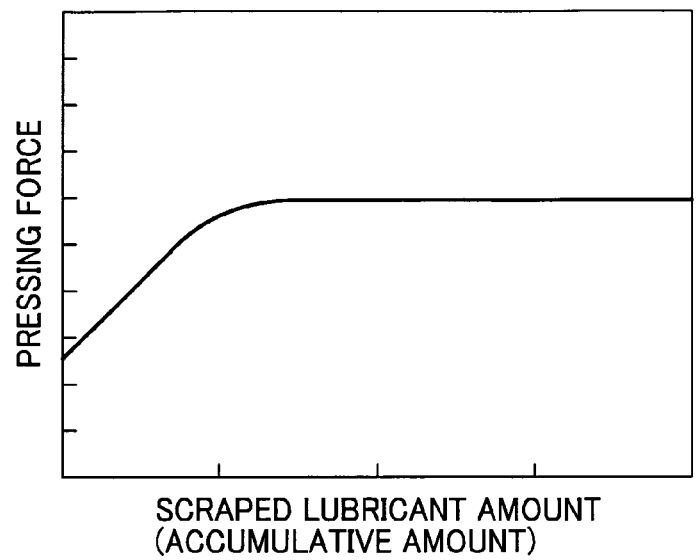
FIG. 7 is a graph showing the temporal change of the pressing force of the solid lubricant by the pressing mechanism.

FIG. 7 is a graph showing the temporal change of the pressing force of the solid lubricant 162 by the pressing mechanism 163 according to the first embodiment.

As shown in FIG. 4, in the initial stage, the initial contact portion of the movable member 163A that has the large curvature R1 contacts the casing inner wall 164. When the solid lubricant 162 is scraped by rubbing the solid lubricant by the brush roller 161 and the accumulative scraping amount of the lubricant increases, the movable member 163A rotates using the attachment position 163B as the fulcrum, and the contact place of the movable member 163A that contacts the casing inner wall 164 comes closes to the intermediate contact portion that has the small curvature R2. Thereby, in the initial stage, the pressing force increases from the initial low pressing force. In the approximately intermediate stage, the pressing force reaches the pressing force that is needed to obtain the appropriate scraping amount of lubricant in the intermediate stage.

That is, in the first embodiment, the curve shape of the contact portion of the movable member 163A is adjusted to realize the pressing force profile where the pressing force N is low in the initial stage, the pressing force N increases until the scraped lubricant amount reaches the constant amount (immediately before the stage becomes the intermediate stage), and the pressing force N becomes constant when the scraped lubricant amount reaches the constant amount (the stage becomes the intermediate stage). This will be specifically described on the basis of FIG. 18. If $1/(L \times \cos \theta)$ is small in the initial stage and the curvature of the curve shape of the contact portion in the initial stage is set to be larger than the curvature of the curve shape of the contact portion in the intermediate stage until the scraped lubricant amount reaches the constant amount (immediately before the stage becomes the intermediate stage), $1/(L \times \cos \theta)$ decreases and $I \times \sin \phi$ increases. For this reason, the pressing force N increases from the initial stage to the intermediate stage. The curve shape of the contact portion of the movable member 163A is determined such that the pressing force N becomes constant when the scraped lubricant amount reaches the constant amount (stage becomes the intermediate stage).

In the first embodiment, the increase rate of the pressing force N in the initial stage or timing where the pressing force N is made to be constant can be adjusted by changing the curvature of the curve shape to form the contact portion of the movable member 163A, the position where the portions having the different curvatures contact, and the position $(I, \phi)$ of the force point.

In the pressing mechanism 463 that is described in Japanese Patent Application Laid-open No. 2007-293240, the curve shape to form the contact portion of the movable member 163A that contacts the casing inner wall 164 from the initial stage to the last stage has the constant curvature. For this reason, it is difficult or not possible to realize the pressing force profile where the pressing force N gradually changes from a low state to a high state in the initial stage and the pressing force N becomes constant when the stage becomes the intermediate stage. Therefore, in the first embodiment, the pressing force profile can be realized by changing the curvature of the curve shape to form the contact portion of the movable member 163A.

Figure 8:
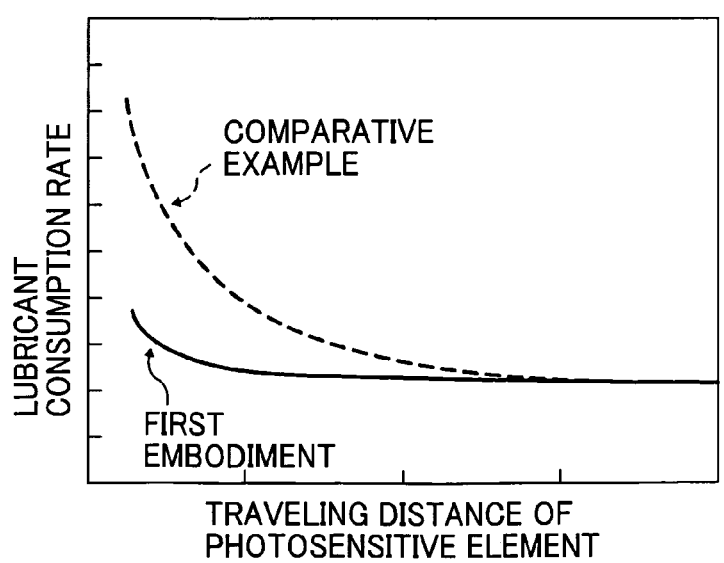
FIG. 8 is a graph showing the temporal changes of lubricant consumption rates from the initial stage to the intermediate stage that are compared between the lubricant coating device and a lubricant coating device according to a comparative example.

FIG. 8 is a graph showing the temporal changes of lubricant consumption rates from the initial stage to the intermediate stage that are compared between the lubricant coating device 16 according to the first embodiment and a lubricant coating device according to a comparative example.

In this case, the lubricant consumption rate means the scraped lubricant amount per unit distance of the traveling distance of the photosensitive element. The comparative example is the same as the first embodiment in that the curve shape to form the contact portion of the movable member 163A has the constant curvature. The curvature of the contact portion according to the comparative example is determined such that the same lubricant consumption rate as that of the first embodiment is obtained in the intermediate stage. As can be seen from the graph, according to the first embodiment, the excessive amount of the lubricant consumption rate in the initial stage can be greatly decreased.

[Modification]

Next, a modification of the pressing mechanism 263 according to the first embodiment will be described.

In the first embodiment, the pressing force profile is realized by devising the curve shape to form the contact portion of the movable member 163A. However, in this modification, the pressing force profile is realized by devising the configuration of the side of the contacting portion which the contact portion of the movable member 263A contacts. In the description below, the same components as those of the first embodiment are denoted by the same reference numerals.

Figure 9:
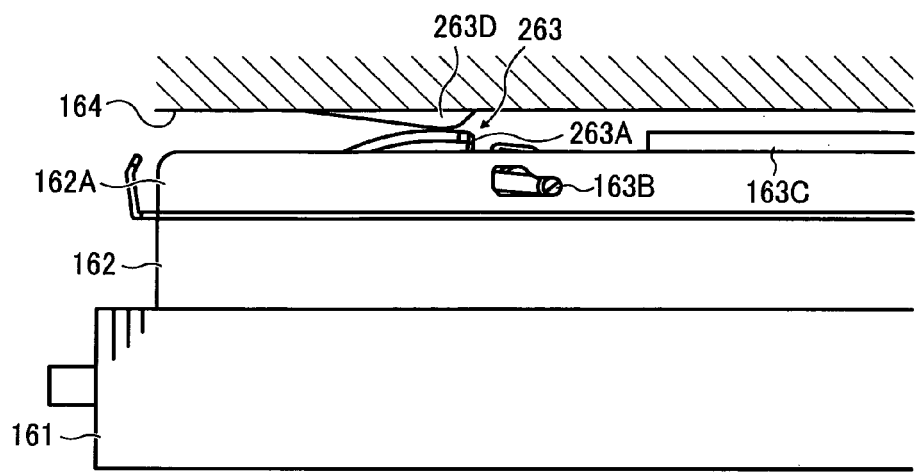
FIG. 9 is a diagram showing a contact state of a movable member and an inclination stand provided in a casing inner wall in the initial stage, in a modification.

FIG. 9 shows a contact state of the movable member 263A and an inclination stand 263D corresponding to the contacting portion provided in the casing inner wall 164 in the initial stage.

Figure 10:
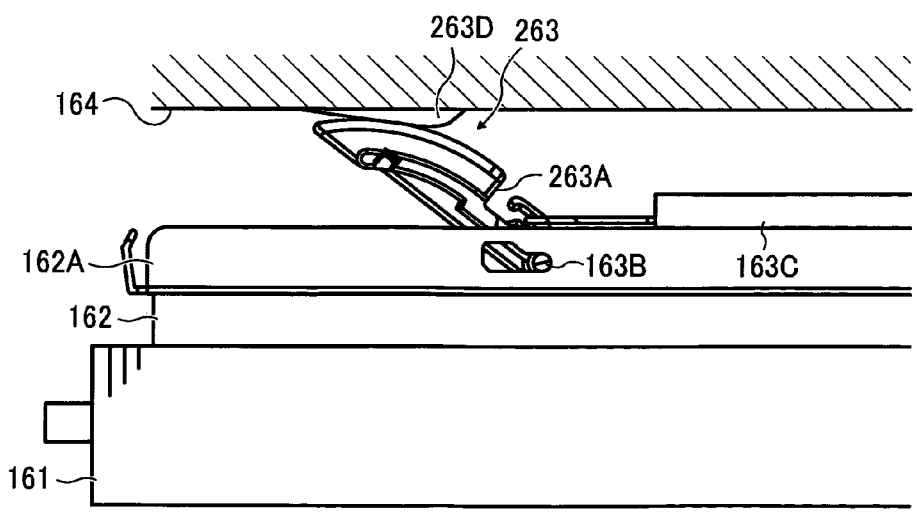
FIG. 10 is a diagram showing a contact state of the movable member and the inclination stand in the intermediate stage.

FIG. 10 shows a contact state of the movable member 263A and the inclination stand 263D provided in the casing inner wall 164 in the intermediate stage.

Figure 11:
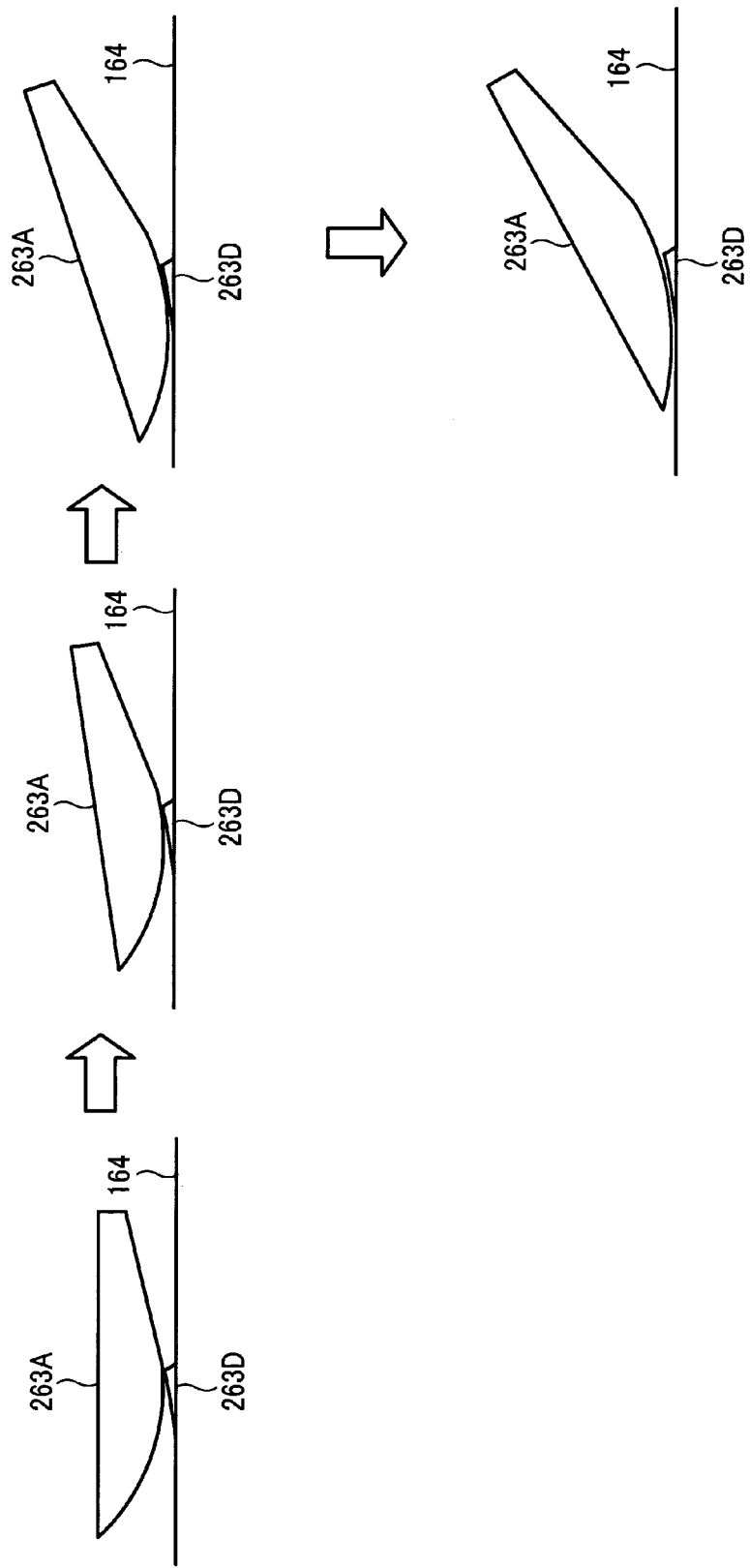
FIG. 11 is a diagram showing the posture change of the movable member from the initial stage to the last stage.

FIG. 11 shows the posture change of the movable member 263A from the initial stage to the last stage.

In this modification, the contact portion of the movable member 263A that contacts the inclination stand 263D of the casing inner wall 164 from the initial stage to the last stage has a curve shape with the single curvature R1. In this modification, a sectional shape of the inclination stand 263D is adjusted such that the same pressing force profile as that in the first embodiment where the pressing force N is low in the initial stage, the pressing force N increases until the scraped lubricant amount reaches the constant amount (immediately before the stage becomes the intermediate stage), and the pressing force N becomes constant when the scraped lubricant amount reaches the constant amount (stage becomes the intermediate stage) can be realized. This will be specifically described on the basis of FIG. 18. The change amount of cos θ×L becomes constant or decreases and I×sin φ increases, until the scraped lubricant amount reaches the constant amount (immediately before the stage becomes the intermediate stage). When the scraped lubricant amount reaches the constant amount (stage becomes the intermediate stage), the pressing force N becomes constant.

In this modification, an increase rate of the pressing force in the initial stage or timing where the pressing force N is made to be constant can be adjusted by changing the height of an uppermost point of the inclination stand 263D which the contact portion of the movable member 263A contacts, the length of an inclination surface (surface which contacts the contact portion of the movable member 163A) of the inclination stand 263D, an inclination angle of the inclination surface, and the position (I, φ) of the force point.

In the pressing mechanism 463 that is described in Japanese Patent Application Laid-open No. 2007-293240, the sectional shape of the casing inner wall 164 that contacts the contact portion of the movable member 263A from the initial stage to the last stage is a linear shape that is orthogonal to the pressing direction. For this reason, it is difficult or not possible to realize the pressing force profile where the pressing force N gradually changes from a low state to a high state in the initial stage and the pressing force N becomes constant when the stage becomes the intermediate stage. Therefore, in this modification, the pressing force profile can be realized by forming providing the contacting portion (inclination stand 263D provided in the casing inner wall 164) to have a sectional shape in which the change amount of L×cos θ from the initial stage to the intermediate stage becomes constant and decreases and I×sin φ increase, as compared with the case where the sectional shape is the linear shape orthogonal to the pressing direction.

According to this modification, even when the curve shape to form the contact portion of the movable member 163A has the constant curvature, the same pressing force profile as that of the first embodiment can be realized. In this modification, it is difficult to manufacture the movable member 163A having the plural curvatures with high precision, and a manufacturing cost thereof increases. However, the inclination stand 263D according to this modification can be easily manufactured and a manufacturing cost thereof can be decreased.

In this modification, the case where the curve shape to form the contact portion of the movable member 263A has the constant curvature is described. However, the contact portion of the movable member 263A may have the curve shape with the plural curvatures, as in the first embodiment described above. In this case, the pressing force profile can be minutely adjusted.

Second Embodiment

Next, another embodiment (hereinafter, this embodiment is referred to as a "second embodiment") where the present invention is applied to a printer functioning as an image forming apparatus will be described.

The basic configuration of the printer according to the second embodiment is the same as that of the first embodiment, but the configuration of a pressing mechanism of a lubricant coating device is different from that of the first embodiment. In the description below, the same components as those of the first embodiment are denoted by the same reference numerals.

Similar to the first embodiment, in the second embodiment, the variation of the pressing force of the solid lubricant with respect to the brush roller 161 from the initial stage to the last stage can be minimized. Meanwhile, in the last stage where the solid lubricant of the predetermined or more is scraped and the remaining solid lubricant amount becomes small, bristling is generated at the brush roller 161 over time, and the scraping capability of the brush roller 161 is lowered. For this reason, even though the variation of the pressing force of the solid lubricant with respect to the brush roller 161 from the initial stage to the last stage is small, the scraped lubricant amount is insufficient in the last stage. As a result, the amount of the powdery lubricant that is supplied to the surface of the photosensitive element 5 in the last stage is insufficient and a cleaning defect is caused.

Therefore, in the second embodiment, instead of decreasing (substantially equalizing) the variation of the pressing force of the solid lubricant with respect to the brush roller 161 from the initial stage to the last stage, the pressing force of the solid lubricant with respect to the brush roller 161 is increased in the last stage.

Figure 12:
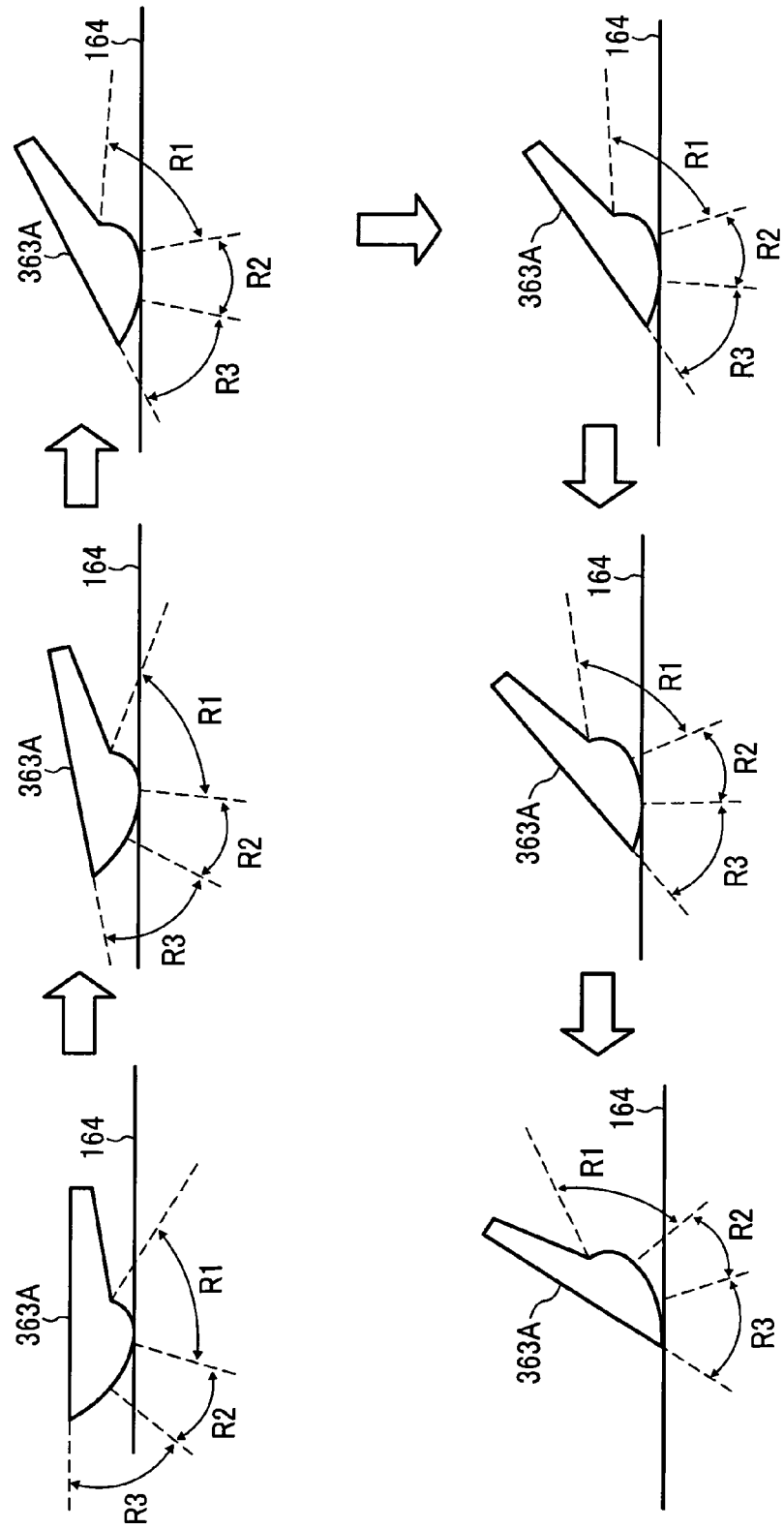
FIG. 12 is a diagram showing the posture change of a movable member from the initial stage to the last stage, in a second embodiment.

FIG. 12 shows the posture change of the movable member 363A from the initial stage to the last stage.

In the second embodiment, the curvature R1 of a contact place of the movable member 363A that contacts the casing inner wall 164 in the initial stage in the contact portion of the movable member 363A contacting the casing inner wall 164 from the initial stage to the last stage, the curvature R2 of a contact place of the movable member 363A that contacts the casing inner wall 164 in the intermediate stage, and the curvature R3 of a contact place of the movable member 363A that contacts the casing inner wall 164 in the last stage are different from each other. Specifically, a curve shape of the contact portion of the movable member 363A is determined such that the curvature R3 corresponding to the last stage becomes larger than the curvature R2 corresponding to the intermediate stage. Thereby, the pressing force of the solid lubricant in the last stage becomes greater than the pressing force of the solid lubricant in the intermediate stage.

Similar to the case of the first embodiment, the curve shape of the contact portion of the movable member 163A is determined such that the curvature R1 corresponding to the initial stage becomes larger than the curvature R2 corresponding to the intermediate stage.

Figure 13:
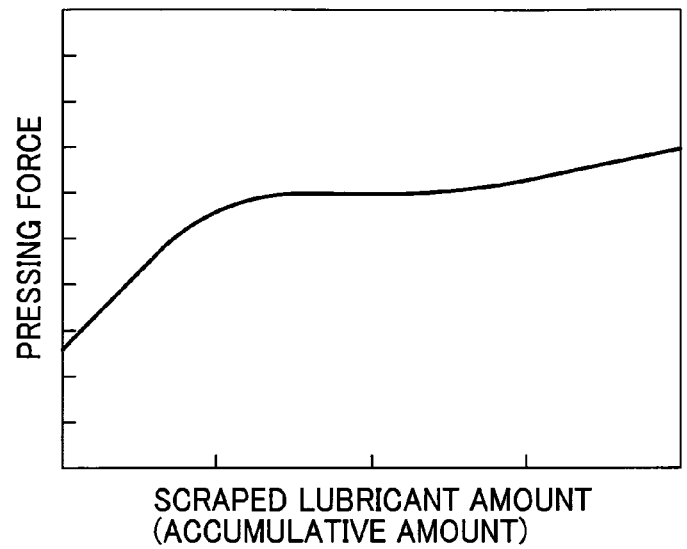
FIG. 13 is a graph showing the temporal change of the pressing force of a solid lubricant by a pressing mechanism according to the second embodiment.

FIG. 13 is a graph showing the temporal change of the pressing force of the solid lubricant 162A by the pressing mechanism 363 according to the second embodiment.

In the second embodiment, the pressing force profile in the initial stage is the same as that of the first embodiment. However, in the last stage, a contact portion of the movable member 163A that has the curvature R3 contacts the casing inner wall 164, as shown in FIG. 12. In the last stage, the pressing force gradually increases from the first pressing force (pressing force in the intermediate stage), and the pressing force where the desired scraped lubricant amount is obtained even though the scraping capability of the brush roller 161 is lowered can be realized. That is, in the second embodiment, the curve shape of the contact portion of the movable member 163A is adjusted such that the pressing force N gradually increases when the intermediate stage becomes the last stage. This will be specifically described on the basis of FIG. 18. The curve shape of the contact portion of the movable member 163A is determined such that 1/(L×cos θ) becomes larger than that in the intermediate stage (L×cos θ decreases), when the stage becomes the last stage.

In the second embodiment, an increase rate of the pressing force N in the last stage or timing where the pressing force N increases from the constant pressing force can be adjusted by changing the curvature of the curve shape to form the contact portion of the movable member 163A, the contact positions of the portions having the different curvatures, and the position (I, ϕ) of the force point.

Figure 14:
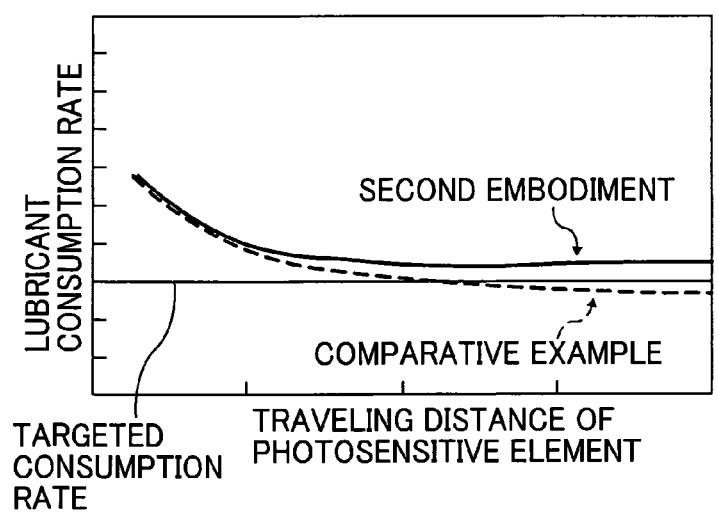
FIG. 14 is a graph showing the temporal changes of lubricant consumption rates from the initial stage to the last stage that are compared between a lubricant coating device according to the second embodiment and a lubricant coating device according to a comparative example.
Figure 15:
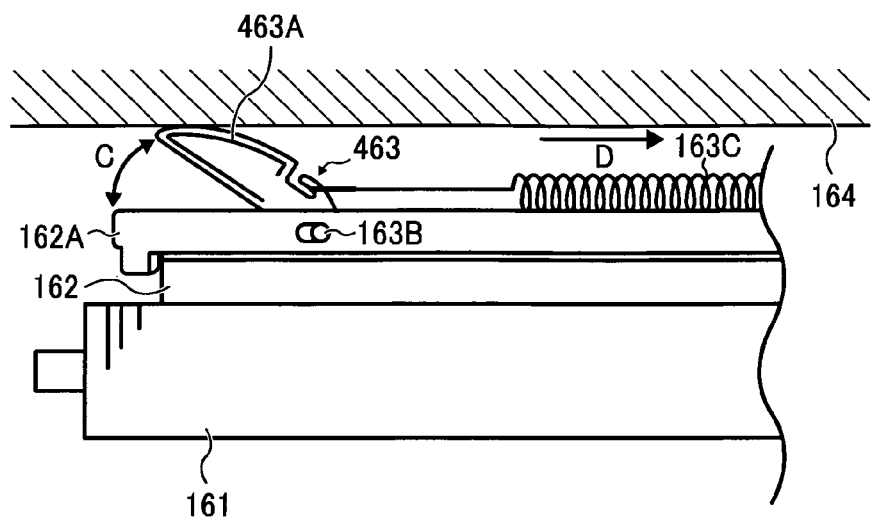
FIG. 15 is a partially enlarged view showing a main portion of a pressing mechanism of a lubricant supply device that is described in Japanese Patent Application Laid-open No. 2007-293240.

FIG. 14 is a graph showing the temporal changes of lubricant consumption rates from the initial stage to the last stage that are compared between a lubricant coating device according to the second embodiment and a lubricant coating device according to a comparative example.

The comparative example of the graph is the same as the comparative example described in the first embodiment. As can be seen from the graph, according to the second embodiment, the insufficient amount of the lubricant consumption rate in the last stage can be replenished, and the lubricant consumption rate of the targeted consumption rate or more can be realized in the last stage.

In the second embodiment, the case where the insufficiency of the scraped lubricant amount in the last stage is suppressed by devising the curve shape to form the contact portion of the movable member 263A is described. However, similar to the modification of the first embodiment, the pressing force profile of the last stage in the second embodiment can be realized by devising the side of the contacting portion. Of course, the desired pressing force profile in the last stage may be realized by devising both the curve shape to form the contact portion of the movable member 263A and the contacting portion.

Further, in the second embodiment, similar to the first embodiment, the insufficiency of the scraped lubricant amount in the last stage and the excess of the scraped lubricant amount in the initial stage can be suppressed by devising the curve shape to form the contact portion of the movable member 263A. However, only the insufficiency of the scraped lubricant amount in the last stage may be suppressed.

Further, in the second embodiment, instead of the configuration where the excess of the scraped lubricant amount in the initial stage is suppressed by devising the curve shape to form the contact portion of the movable member 263A, the configuration according to the modification may be adopted.

The printer according to the first and second embodiments is an image forming apparatus that has the photosensitive element 5 that functions as the image carrier and the lubricant coating device 16 that is the lubricant supply device functioning as the lubricant supply unit to supply the lubricant to the surface of the photosensitive element 5, and finally transfers the image on the photosensitive element 5 to the transfer paper corresponding to the recording material and forms an image on the transfer paper. The lubricant coating device 16 includes the solid lubricant 162, the brush roller 161 functioning as a supply member that contacts the solid lubricant 162 and supplies the lubricant scraped by rubbing the solid lubricant 162 to the surface of the photosensitive element 5 corresponding to the lubricant supply target, and the pressing mechanisms 163, 263, and 363 that press the solid lubricant 162 against the brush roller 161. The pressing mechanisms 163, 263, and 363 include the single spring 163C that is the single biasing unit and the movable members 163A, 263A, and 363A functioning as the plural pressing members that receive the biasing force of the single spring 163C and press the places of the solid lubricant 162 at the symmetrical positions with respect to the center of the contact portion of the solid lubricant 162, respectively. Each of the movable members 163A, 263A, and 363A receives the biasing force of the single spring 163C and rotates around the fulcrum 163B, and the contact place that contacts the casing inner wall 164 corresponding to the contacting portion or the inclination stand 263D provided in the casing inner wall 164 is changed. The pressing mechanisms 163, 263, and 363 are configured such that the angle (π−θ) formed between the direction connecting the action points where the movable members 163A, 263A, and 363A contact the contacting portions 164 and 263D and the fulcrum 163B and the pressing direction of the solid lubricant 162 decreases and the angle ϕ formed between the direction connecting the force points of the movable members 163A, 263A, and 363A receiving the biasing force of the single spring 163C and the fulcrum 163B and the direction of the biasing force increases, according to the decrease of the solid lubricant 162 by the rubbing.

In the second embodiment, the pressing force N with respect to the pressing direction of the solid lubricant 162 that is generated at the action points in the last stage becomes greater than the pressing force in the intermediate stage, from the initial stage where the solid lubricant 162 starts to be scraped by rubbing to the last stage after the solid lubricant 162 of the predetermined amount or more is scraped via the intermediate stage. Thereby, even though the pressing force N is constant from the initial stage to the last stage, the problem of the insufficiency of the scraped lubricant amount that is generated in the last stage can be resolved.

In the first embodiment (including the modification), the pressing force N with respect to the pressing direction of the solid lubricant 162 that is generated at the action points in the initial stage becomes smaller than the pressing force in the intermediate stage, from the initial stage where the solid lubricant 162 starts to be scraped by rubbing to the last stage after the solid lubricant 162 of the predetermined amount or more is scraped via the intermediate stage. Thereby, even though the pressing force N is constant from the initial stage to the last stage, the problem of the excess of the scraped lubricant amount that is generated in the initial stage can be resolved.

In the first embodiment, the contact portion of each movable member 463A that becomes the contact place contacting the casing inner wall 164 corresponding to the contacting portion from the initial stage to the last stage is configured such that a sectional shape along the surface parallel to both the direction connecting the action point and the fulcrum 163B and the direction connecting the force point and the fulcrum 163B is a curve shape, the curvature R1 of the contact place contacting the casing inner wall 164 in the initial stage is different from the curvature R2 of the contact place contacting the casing inner wall 164 in the intermediate stage, and the pressing force N with respect to the pressing direction of the solid lubricant 162 generated at the action point in the initial stage becomes smaller than the pressing force in the intermediate stage. Thereby, the desired pressing force profile in the initial stage can be realized with the simple configuration.

In the modification, the sectional shape of the inclination stand 263D that is the contacting portion along the surface parallel to both the direction connecting the action point and the fulcrum 163B and the direction connecting the force point and the fulcrum 163B is configured as a shape in which the change amount of L×cos θ from the initial stage to the intermediate stage becomes constant or decreases as compared with the change amount in the case where the sectional shape is the linear shape orthogonal to the pressing direction, and sin φ increases. Therefore, the pressing force N with respect to the pressing direction of the solid lubricant 162 that is generated at the action point in the initial stage becomes smaller than the pressing force in the intermediate stage. Thereby, the desired pressing force profile in the initial stage can be realized with the simple configuration. As compared with the case where the curve shape of the movable member 163A is devised, manufacturing is easy and a manufacturing cost can be decreased.

In the first embodiment (including the modification), the solid lubricant 162 is obtained by compressing and forming the powdery lubricant and the scraped lubricant amount in the initial stage becomes easily excessive. However, as described above, because the excess of the scraped lubricant amount in the initial stage is suppressed, even though this solid lubricant is used, the life span of the solid lubricant can be suppressed from decreasing.

In the second embodiment, the excess of the scraped lubricant amount in the initial stage and the insufficiency of the scraped lubricant amount in the last stage can be suppressed. As a result, the variation of the scraped lubricant amount from the initial stage to the last stage can be decreased, and the powdery lubricant of the stabilized amount can be supplied to the surface of the photosensitive element over time.

In the second embodiment, the contact portion of each movable member 463A that becomes the contact place contacting the casing inner wall 164 corresponding to the contacting portion from the initial stage to the last stage is configured such that a sectional shape along the surface parallel to both the direction connecting the action point and the fulcrum 163B and the direction connecting the force point and the fulcrum 163B is a curve shape, the curvature R3 of the contact place contacting the casing inner wall 164 in the last stage is different from the curvature R2 of the contact place contacting the casing inner wall 164 in the intermediate stage, and the pressing force N with respect to the pressing direction of the solid lubricant 162 generated at the action point in the last stage becomes greater than the pressing force in the intermediate stage. Thereby, the desired pressing force profile in the last stage can be realized with the simple configuration.

In the second embodiment, the sectional shape of the inclination stand that is the contacting portion along the surface parallel to both the direction connecting the action point and the fulcrum 163B and the direction connecting the force point and the fulcrum 163B may be configured as a shape in which 1/(L×cos θ) from the intermediate stage to the last stage becomes larger than that of the intermediate stage as compared with the case where the sectional shape is the linear shape orthogonal to the pressing direction, and the pressing force N with respect to the pressing direction of the solid lubricant 162 that may be generated at the action point in the last stage may become greater than the pressing force in the intermediate stage. In this case, the desired pressing force profile in the last stage can be realized with the simple configuration. As compared with the case where the curve shape of the movable member 363A is devised, manufacturing is easy and a manufacturing cost can be decreased.

In the first and second embodiments, the single spring 163C generates the biasing force of the direction that is orthogonal to the pressing direction. By this configuration, as described above, the single spring 163C that is longer than the general pressing mechanism 563 can be adopted. As a result, the change of the amount of the powdery lubricant that is supplied to the surface of the photosensitive element 5 from the initial stage to the last stage can be minimized.

In the first and second embodiments, the lubricant holding member 162A that holds the solid lubricant 162 is provided, and each of the movable members 163A, 263A, and 363A is pressed through the lubricant holding member 162A. By this configuration, workability of when the solid lubricant 162 is assembled in the device is improved.

In the first and second embodiments, the single spring 163C is used as the single biasing unit. However, another biasing unit such as an elastic body made of rubber may be used. The single spring 163C that is used in the first embodiment is the tension spring. A compression spring may be used according to the configuration of the pressing mechanism.

In the first and second embodiments described above, the case where the lubricant is supplied to the surface of the photosensitive element 5 is described. However, the lubricant may be supplied to the surface of a surface of another image carrier such as an intermediate transfer body or a recording material conveying member to carry a recording material such as transfer paper.

According to the invention, the insufficient supply amount of lubricant in the last stage or/and the excessive supply amount of lubricant in the initial stage may be further prevented, and thus the variation in the supply amount of lubricant from the initial stage to the last stage can be decreased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lubricant supply device comprising:
a solid lubricant;
a supply member that makes contact with the solid lubricant and supplies a lubricant being scraped off by rubbing the solid lubricant, to a lubricant supply target; and
a pressing mechanism that presses the solid lubricant against the supply member, wherein
the pressing mechanism includes a single biasing unit, and a plurality of pressing members that receive the biasing force of the single biasing unit and press the solid lubricant at symmetric positions with respect to the center of a contact portion of the solid lubricant,
each of the plurality of pressing members changes a contacting point against a contact place to a contacting portion by rotating around a fulcrum with the biasing force,
the pressing mechanism is configured such that an angle formed between a direction connecting an action point where each pressing member contacts the contacting portion and the fulcrum and a pressing direction of the solid lubricant decreases, and an angle formed between a direction connecting a force point of each pressing member receiving the biasing force of the single biasing unit and the fulcrum and a direction of the biasing force increases, according to the decrease of the solid lubricant by the rubbing, and
from an initial stage where the solid lubricant starts to be scraped off by rubbing to a last stage after a predetermined amount or more of the solid lubricant is scraped off via an intermediate stage, the pressing force in the pressing direction of the solid lubricant that is generated at the action point in the last stage becomes greater than the pressing force in the intermediate stage.

2. The lubricant supply device of claim 1,
wherein the contact portion of each movable member that becomes the contact place contacting the contacting portion from the initial stage to the last stage is configured such that a sectional shape along a surface parallel to both the direction connecting the action point and the fulcrum and the direction connecting the force point and the fulcrum is a curve shape, and
the curvature of the contact place contacting the contacting portion in the last stage is different from the curvature of the contact place contacting the contacting portion in the intermediate stage, such that the pressing force in the pressing direction of the solid lubricant generated at the action point in the last stage becomes greater than the pressing force in the intermediate stage.

3. The lubricant supply device of claim 1,
wherein a sectional shape of the contacting portion along the surface parallel to both the direction connecting the action point and the fulcrum and the direction connecting the force point and the fulcrum is configured as a shape in which the change amount of $L \times \cos\theta$ from the intermediate stage to the last stage becomes constant or decreases as compared with the change amount in the case where the sectional shape is a linear shape orthogonal to the pressing direction, and the pressing force in the pressing direction of the solid lubricant that is generated at the action point in the last stage becomes greater than the pressing force in the intermediate stage, where the distance from the action point to the fulcrum is denoted by L and the angle formed between the direction connecting the action point and the fulcrum and the pressing direction is expressed by $((\Pi/2)-\theta)$.

4. The lubricant supply device of claim 1,
wherein the biasing unit generates the biasing force in a direction that is orthogonal to the pressing direction of the solid lubricant.

5. The lubricant supply device of claim 1, further comprising:
a lubricant holding member that holds the solid lubricant, wherein the plurality of pressing members are pressed through the lubricant holding member.

6. The lubricant supply device of claim 1,
wherein the biasing unit is a spring.

7. A process cartridge that integrally supports an image carrier and a lubricant supply unit which supplies a lubricant to a surface of the image carrier, and is attached to a main body of an image forming apparatus,
wherein the lubricant supply device of claim 1 is used as the lubricant supply unit.

8. An image forming apparatus that includes an image carrier and a lubricant supply unit which supplies a lubricant to a surface of the image carrier, and finally transfers an image on the image carrier to a recording material and forms the image on the recording material,
wherein the lubricant supply device of claim 1 is used as the lubricant supply unit.

9. A lubricant supply device comprising:
a solid lubricant;
a supply member that makes contact with the solid lubricant and supplies a lubricant being scraped off by rubbing the solid lubricant, to a lubricant supply target; and
a pressing mechanism that presses the solid lubricant against the supply member, wherein
the pressing mechanism includes a single biasing unit, and a plurality of pressing members that receive the biasing force of the single biasing unit and press the solid lubricant at symmetric positions with respect to the center of a contact portion of the solid lubricant,
each of the plurality of pressing members changes a contacting point against a contact place to a contacting portion by rotating around a fulcrum with the biasing force,
the pressing mechanism is configured such that an angle formed between a direction connecting an action point where each pressing member contacts the contacting portion and the fulcrum and a pressing direction of the solid lubricant decreases, and an angle formed between a direction connecting a force point of each pressing member receiving the biasing force of the single biasing unit and the fulcrum and a direction of the biasing force increases, according to the decrease of the solid lubricant by the rubbing, and
from an initial stage where the solid lubricant starts to be scraped off by rubbing to a last stage after a predetermined amount or more of the solid lubricant is scraped off via an intermediate stage, the pressing force in the pressing direction of the solid lubricant that is generated at the action point in the initial stage becomes smaller than the pressing force in the intermediate stage.

10. The lubricant supply device of claim 9,
wherein the contact portion of each movable member that becomes the contact place contacting the contacting portion from the initial stage to the last stage is configured such that a sectional shape along a surface parallel to both the direction connecting the action point and the fulcrum and the direction connecting the force point and the fulcrum is a curve shape, and
the curvature of the contact place contacting the contacting portion in the initial stage is different from the curvature of the contact place contacting the contacting portion in the intermediate stage, so that the pressing force in the pressing direction of the solid lubricant generated at the action point in the initial stage becomes smaller than the pressing force in the intermediate stage.

11. The lubricant supply device of claim 9,
wherein the sectional shape of the contacting portion along the surface parallel to both the direction connecting the action point and the fulcrum and the direction connecting the force point and the fulcrum is configured as a shape in which the change amount of $L \times \cos\theta$ from the initial stage to the intermediate stage becomes constant or decreases as compared with the change amount in the case where the sectional shape is a linear shape orthogonal to the pressing direction, and the pressing force in the pressing direction of the solid lubricant that is generated at the action point in the initial stage becomes smaller than the pressing force in the intermediate stage, where the distance from the action point to the fulcrum is denoted by L and the angle formed between the direction connecting the action point and the fulcrum and the pressing direction is expressed by $((\Pi/2)-\theta)$.

12. The lubricant supply device of claim 9,
wherein the solid lubricant is obtained by compressing a powdery lubricant.

13. The lubricant supply device of claim 9,
wherein the pressing force in the pressing direction of the solid lubricant that is generated at the action point in the last stage becomes greater than the pressing force in the intermediate stage.

14. The lubricant supply device of claim 13,
wherein the contact portion of each movable member that becomes the contact place contacting the contacting portion from the initial stage to the last stage is configured such that a sectional shape along a surface parallel to both the direction connecting the action point and the fulcrum and the direction connecting the force point and the fulcrum is a curve shape, and the curvature of the contact place contacting the contacting portion in the last stage is different from the curvature of the contact place contacting the contacting portion in the intermediate stage, such that the pressing force in the pressing direction of the solid lubricant generated at the action point in the last stage becomes greater than the pressing force in the intermediate stage.

15. The lubricant supply device of claim 13, wherein a sectional shape of the contacting portion along the surface parallel to both the direction connecting the action point and the fulcrum and the direction connecting the force point and the fulcrum is configured as a shape in which the change amount of $L \times \cos \theta$ from the intermediate stage to the last stage becomes constant or decreases as compared with the change amount in the case where the sectional shape is a linear shape orthogonal to the pressing direction, and the pressing force in the pressing direction of the solid lubricant that is generated at the action point in the last stage becomes greater than the pressing force in the intermediate stage, where the distance from the action point to the fulcrum is denoted by L and the angle formed between the direction connecting the action point and the fulcrum and the pressing direction is expressed by $((\Pi/2)-\theta)$.

16. The lubricant supply device of claim 9, wherein the biasing unit generates the biasing force in a direction that is orthogonal to the pressing direction of the solid lubricant.

17. The lubricant supply device of claim 9, further comprising:

a lubricant holding member that holds the solid lubricant, wherein the plurality of pressing members are pressed through the lubricant holding member.

18. The lubricant supply device of claim 9, wherein the biasing unit is a spring.

19. A process cartridge that integrally supports an image carrier and a lubricant supply unit which supplies a lubricant to a surface of the image carrier, and is attached to a main body of an image forming apparatus, wherein the lubricant supply device of claim 9 is used as the lubricant supply unit.

20. An image forming apparatus that includes an image carrier and a lubricant supply unit which supplies a lubricant to a surface of the image carrier, and finally transfers an image on the image carrier to a recording material and forms the image on the recording material, wherein the lubricant supply device of claim 9 is used as the lubricant supply unit.

* * * * *